(12) United States Patent
Wachi

(10) Patent No.: US 6,260,524 B1
(45) Date of Patent: Jul. 17, 2001

(54) VALVE TIMING CONTROL SYSTEM FOR INTERNAL COMBUSTION ENGINE

(75) Inventor: Satoshi Wachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/561,968

(22) Filed: May 1, 2000

(30) Foreign Application Priority Data

Nov. 30, 1999 (JP) .................................................. 11-340355

(51) Int. Cl.$^7$ ..................................................... F02D 13/02
(52) U.S. Cl. ..................................... 123/90.15; 123/90.17
(58) Field of Search .............................. 123/90.15, 90.16, 123/90.17, 90.18, 90.31

(56) References Cited

U.S. PATENT DOCUMENTS

| 5,937,806 | * | 8/1999 | Lyko et al. | 123/90.15 |
| 5,937,808 |   | 8/1999 | Kako et al. | 123/90.15 |
| 5,957,095 | * | 9/1999 | Kako        | 123/90.15 |

FOREIGN PATENT DOCUMENTS 8-338271   12/1996   (JP) .

* cited by examiner

*Primary Examiner*—Weilun Lo
(74) *Attorney, Agent, or Firm*—Sughrue, Mion, Zinn, Macpeak & Seas, PLLC

(57) ABSTRACT

A valve timing control system for an internal combustion engine allows an actual valve timing (Ta) for an intake valve (17) and/or an exhaust valve (18) to converge speedily to a desired valve timing (To) even when control quantities for the engine are initialized immediately after power-on or restoration of a normal operation state from an abnormal state, to thereby suppress degradation of engine performance and exhaust gas quality. The valve timing control system includes an actual valve timing control means (204) for generating a control quantity (i) for the variable valve timing mechanism (40) so that a timing deviation (ER) of the actual valve timing (Ta) from the desired valve timing (To) becomes zero, an integral control means (205) for arithmetically determining an integral correcting value (ΣKi) by integrating the timing deviation (ER) for thereby correcting the control quantity (i), a means (207) for detecting as an initializing condition an engine operation state in which the integral correcting value (ΣKi) is to be initialized, and a means (208) for initializing the integral correcting value (ΣKi) to an optimum value conforming with the engine operation state when the initializing condition is detected, wherein the initializing means (208) is so designed as to set an initial value of the integral correcting value (ΣKi) to a negative value.

13 Claims, 21 Drawing Sheets

X-X SECTION IN FIG. 11

ROTATING DIRECTION

Y-Y SECTION IN FIG. 11

ROTATING DIRECTION

Z-Z SECTION IN FIG. 11

ROTATING DIRECTION

VVT 40 ROTATING DIRECTION

VALVE TIMING CONTROL SYSTEM FOR INTERNAL COMBUSTION ENGINE

BACKGROUND OF THE INVENTION

1. Field of the Invention

The present invention relates generally to a valve timing control system for adjusting or controlling valve timing at which an intake valve and/or an exhaust valve of an internal combustion engine is opened and closed in dependence on operating state of the engine. More particularly, the present invention is concerned with a valve timing control system for an internal combustion engine which system is capable of controlling the valve timing such that an actual valve timing can speedily converge to a desired valve timing immediately after power-on of the engine or immediately upon restoration of engine operation state to a normal state from an abnormal state in which some abnormality has occurred in the engine operation state and which is further capable of suppressing overshoot of the actual valve timing, to thereby protect the operation performance of the engine against degradation while protecting the exhaust gas quality against deterioration with high reliability essentially without fail.

2. Description of Related Art

In the technical field of the internal combustion engine, a system for controlling variably the operation timing for at least one of an intake valve and an exhaust valve in dependence on the operation state of the internal combustion engine is well known. The valve timing control system of this type includes a mechanism for holding or controlling variably the valve timing in dependence on the engine operation state with a view to realizing an optimal valve timing control.

By way of example, the timing for opening the intake valve is held in an advanced phase when the engine rotation number is in a stable intermediate range for the purpose of realizing an EGR (Exhaust Gas Recirculation) function, whereas when the engine rotation number is in a higher speed range or in a lower speed range, the intake valve is held in a retarded phase in order to secure a high output torque or ensure a stable operation state.

In the following, referring to FIGS. 10 to 31, description will be made of the conventional valve timing control system for the internal combustion engine. FIG. 10 is a schematic diagram showing generally a configuration of a gasoline engine system equipped with a conventional valve-timing regulating or controlling mechanism. Referring to the figure, an internal combustion engine denoted generally by reference numeral 1 constitutes a major part of the gasoline engine system and includes a plurality of cylinders (e.g. four cylinders). In FIG. 10, however, only one cylinder and associated components are illustrated representatively.

As is shown in FIG. 10, a cylinder block 2 forms a cylinder portion of the engine 1. A cylinder head 3 is connected to the cylinder block 2 at a top end thereof. A piston 4 is housed within a cylinder chamber formed in the cylinder block 2 so as to move reciprocatively in the vertical direction. A crank shaft 5 is operatively coupled to the piston 4 at a bottom end thereof and caused to rotate in unison with the reciprocative motion of the piston 4.

A crank angle sensor 6 which can be disposed, for example, in the vicinity of the crank shaft 5 is constituted by an electromagnetic pickup or sensor to serve for generating a crank angle signal SGT in synchronism with revolution of the engine 1. The crank angle signal SGT is utilized not only for detecting the engine speed or engine rotation number NE (rpm) of the engine 1 but also for the detection that the crank shaft 5 is at a predetermined reference crank angle (° CA).

A signal rotor 7 is integrally mounted on the crank shaft 5 and has an outer peripheral surface formed with a pair of teeth 7a with an angular distance of 180° therebetween. The teeth 7a are formed of a magnetic material. Upon every passing of each tooth 7a in front of the crank angle sensor 6, a pulse-like crank angle signal SGT is generated by the crank angle sensor 6.

A combustion chamber 8 is defined by inner walls of the cylinder block 2 and the cylinder head 3 and a top wall of the piston 4, respectively. Air-fuel mixture charged into the engine 1 undergoes combustion within the combustion chamber 8. A spark plug 9 is disposed at the top of the cylinder head 3 so as to partially project into the combustion chamber 8. The air-fuel mixture is fired by electric discharge taking place at the spark plug 9.

A distributor 10 is installed, being coupled to an exhaust-side cam shaft 20 (described hereinafter) which is mounted on the cylinder head 3 for applying a high ignition voltage sequentially to the spark plugs 9 provided for the individual cylinders, respectively. To this end, an ignitor 11 is provided for generating the high firing voltage.

More specifically, each of the spark plugs 9 is electrically connected to the distributor 10 by way of a high-voltage rated cord (not shown), wherein the high voltage outputted from the ignitor 11 is distributed to the individual spark-plugs 9, respectively, by means of the distributor 10 in synchronism with the rotation of the crank shaft 5.

Further installed in association with the cylinder block 2 is a water temperature sensor 12 which serves for detection of a temperature W of cooling water flowing through a coolant passage. An intake port 13 is provided at an intake side of the cylinder head 3 while an exhaust port 14 is disposed at an exhaust side of the cylinder head 3.

An intake passage 15 is communicated to the intake port 13 with an exhaust passage 16 being communicated to the exhaust port 14. An intake valve 17 is disposed in the intake port 13 of the cylinder head 3 while an exhaust valve 18 is installed in the exhaust port 14 of the cylinder head 3.

An intake-side cam shaft 19 is disposed above the intake valve 17 for driving the intake valve 17 to the open or close state. Similarly, the exhaust-side cam shaft 20 is disposed above the exhaust valve 18 for opening or closing the exhaust valve 18.

An intake timing pulley 21 is mounted on the intake-side cam shaft 19 at one end thereof, while an exhaust timing pulley 22 is mounted on the exhaust-side cam shaft 20 at one end thereof. The intake timing pulley 21 and the exhaust timing pulley 22 are operatively coupled to the crank shaft 5 by means of a timing belt 23 so that each of the cam shafts 19 and 20 can rotate at a speed substantially equal to a half of the rotation speed of the crank shaft 5.

When the engine 1 is in the operating state, the driving torque of the crank shaft 5 is transmitted to the cam shafts 19 and 20, respectively, by way of the timing belt 23 and the timing pulleys 21 and 22 to thereby rotate the cam shafts 19 and 20, respectively.

Thus, the intake valve 17 and the exhaust valve 18 are driven, respectively, to the open/close states in synchronism with the rotation of the crank shaft 5 and hence the vertical reciprocative motion of the piston 4. In other words, each of the intake valve 17 and the exhaust valve 18 is driven with a predetermined open/close timing in synchronism with a series of four strokes, i.e., suction stroke, compression stroke, explosion (expansion) stroke and exhaust stroke of the engine 1.

A cam angle sensor 24 is disposed in the vicinity of the intake-side cam shaft 19 and designed to generate a cam angle signal SGC for detecting the actuation timing (i.e., valve timing) of the intake valve 17.

A signal rotor 25 is integrally mounted on the intake-side cam shaft 19, wherein the outer peripheral surface of the signal rotor 25 is formed with four teeth 25*a* at an angular distance of 90° therebetween. Each of the teeth 25*a* is formed of a magnetic material. Every time each of the teeth 25*a* passes in front of the cam angle sensor 24, a pulse-like cam angle signal (pulse signal indicating the angular position of the cam) SGC is generated by the cam angle sensor 24.

A throttle valve 26 is installed in the intake passage 15 at an intermediate portion thereof and adapted to be selectively opened or closed in response to actuation of an accelerator pedal (not shown), whereby the air-flow quantity fed to the engine 1, i.e., the intake air flow Q, is adjusted or regulated. To this end, a throttle sensor 27 is operatively coupled to the throttle valve 26 for detecting the throttle opening degree θ.

An intake air-flow sensor 28 is disposed at a location upstream of the throttle valve 26 for detecting the intake air flow Q in the intake passage 15 by resorting to, for example, thermal detection technique which per se is known in the art. Further, a surge tank 29 is formed at a location downstream of the throttle valve 26 for suppressing the pulsation of the intake air flow Q.

A fuel injector 30 is mounted in the vicinity of the intake port 13 of each of the individual cylinders, respectively, for injecting fuel for thereby charging the air-fuel mixture into the combustion chamber 8. Each of the fuel injectors 30 is ordinarily constituted by an electromagnetic valve which is opened upon electric energization. Fuel is fed to each of the fuel injectors 30 under pressure from a fuel pump (not shown).

In operation of the engine 1, air is taken into the intake passage 15 while the fuel injector 30 injects fuel in the direction toward the intake port 13. As a result of this, an air-fuel mixture is produced in the intake port 13 to be sucked into the combustion chamber 8 through the intake valve 17 which is adapted to open in the suction stroke.

A variable valve timing (VVT) mechanism 40 is operatively coupled to the intake-side cam shaft 19 and designed to be driven hydraulically (through the medium of lubricant oil of the engine 1) for changing or modifying the valve operation timing of the intake valve 17 (or at least one of the intake valve 17 and the exhaust valve 18). More specifically, the variable valve timing mechanism 40 is so designed as to change the valve operation timing of the intake valve 17 continuously by changing or varying the angle of displacement of the intake-side cam shaft 19 relative to the intake timing pulley 21. To this end, an oil control valve (OCV) 80 is provided for supplying the working oil to the variable valve timing mechanism 40 as well as for adjusting the amount of the working oil.

For the purpose of overall control of the engine operation, there is provided an electronic control unit (ECU) 100 for controlling operations of the various actuators such as the fuel injector 30, the ignitor 11, the oil control valve 80 and others for thereby controlling the fuel injection quantity, the ignition timing, the valve operation timing and others on the basis of the outputs of the various sensors such as the intake air flow Q, cooling water temperature W, crank angle signal SGT, cam angle signal SGC and others which indicate the operation state of the engine. The electronic control unit 100 may be constituted by a microcomputer or microprocessor, as will be described later on.

Next, description is directed to a structure of a variable valve timing system including the variable valve timing (VVT) mechanism 40 and the oil control valve 80 by reference to FIGS. 11 to 19. FIG. 11 is a side elevational view showing partially in section a structural arrangement around the intake-side cam shaft 19 provided in association with the variable valve timing mechanism 40. Further, this figure also shows a structure of the working oil supply means (corresponding to the oil control valve or OCV 80) for driving the variable valve timing mechanism 40. Parenthetically, in FIG. 11, the components same as or equivalent to those described previously are denoted by like reference characters.

Referring to FIG. 11, the variable valve timing mechanism 40 serves to control intake valve timing, while the oil control valve 80 controls the amount of working oil supplied to the variable valve timing mechanism 40. The intake timing pulley 21 rotates in synchronism with the crank shaft 5 through the medium of the endless timing belt 23 moving in unison with the rotation of the crank shaft 5.

Transmitted translationally to the intake-side cam shaft 19 is the rotation of the intake timing pulley 21 with changed or modified phase due to intervention of the variable valve timing mechanism 40.

A bearing 41 is fixedly mounted on the cylinder head 3 (see FIG. 10) for supporting rotatably the intake-side cam shaft 19.

A first oil passage 42 and a second oil passage 43 are provided in association with the intake-side cam shaft 19 and a rotor 52 (described hereinafter), respectively. The first oil passage 42 is communicated to a retarding hydraulic chamber 62 (described hereinafter) for displacing angularly the rotor 52 in the retarding direction while the second oil passage 43 is communicated to an advancing hydraulic chamber 63 (described hereinafter) for displacing angularly the rotor 52 in the advancing direction.

There is further provided an oil pump 91 for taking out working oil (lubricating oil) from an oil pan 90. Additionally, an oil filter 92 is provided for purifying the working oil taken out from the oil pan 90. The oil pan 90, the oil pump 91 and the oil filter 92 cooperate to constitute the lubricating means for lubricating various parts or components of the engine 1 (see FIG. 10) and at the same time constitute a working oil supply means for the variable valve timing (VVT) mechanism 40 in cooperation with the oil control valve (OCV) 80.

A variety of sensors designated generally and collectively by reference numeral 99 includes the sensors such as the crank angle sensor 6 mentioned previously and others provided in association with the engine 1, wherein output signals of these sensors which indicate various operation state information of the engine 1 are inputted to the electronic control unit (ECU) 100.

A spool valve element 82 is mounted within a housing 81 of the oil control valve 80 slidingly movably therein. A linear solenoid 83 controls the spool valve element 82 in accordance with a corresponding control signal outputted from the electronic control unit (ECU) 100. A spring 84 is provided for urging resiliently the spool valve element 82 in the direction opposite to the driving direction of the linear solenoid 83.

The housing 81 is provided with various ports 85 to 87, 88*a* and 88*b*.

The oil supplying port 85 is hydraulically communicated to the oil pump 91 by way of the oil filter 92 while an A-port 86 is hydraulically communicated to the second oil passage 43. On the other hand, exhaust ports 88a and 88b are hydraulically communicated to the oil pan 90.

When the engine 1 is operating, the working oil is taken up from the oil pan 90 by means of the oil pump 91 which is put into operation in response to the rotation of the crank shaft 5. The working oil as taken up from the oil pan 90 and discharged therefrom is fed under pressure selectively to the first oil passage 42 or the second oil passage 43 by means of the oil control valve 80 by way of the oil filter 92.

The flow rate of oil in the first oil passage 42 and the second oil passage 43 (i.e., amount of hydraulic medium or oil flowing through the first oil passage 42 and the second oil passage 43, respectively) is increased or decreased as the opening degrees of the ports 86 and 87 are changed continuously due to sliding movement of the spool valve element 82. In this conjunction, it is noted that the opening degrees of the A-port 86 and the B-port 87 are determined, respectively, in dependence on the value of the control current i (a control quantity) supplied to the linear solenoid 83. Hereinafter, this current will also be referred to as the linear solenoid current i.

The electronic control unit 100 controls the linear solenoid current i on the basis of the signals outputted from the various sensors such as the crank angle sensor 6, the cam angle sensor 24 and others.

The housing 44 of the variable valve timing (VVT) mechanism 40 is mounted rotatably relative to the intake-side cam shaft 19, wherein a casing 45 is fixedly secured to the housing 44. A back spring 46 which may be constituted by a leaf spring is disposed between a tip seal 49 (described hereinafter) and the casing 45 to thereby urge resiliently the tip seal 49 against the rotor 52 (also described hereinafter).

A cover 47 is secured to the casing 45 by means of bolts 48 which secure the housing 44, the casing 45 and the cover 47 to one another. The tip seal 49 mentioned above is pressed against the rotor 52 by means of the back spring 46 to thereby prevent flow of the working oil between the hydraulic chambers partitioned from each other by the rotor 52 and the casing 45 (i.e., prevent leakage of working oil). A plate 50 is secured to the cover 47 by means of a screw 51.

The rotor 52 is fixedly mounted on the intake-side cam shaft 19 and disposed rotatably relatively to the casing 45. The rotor 52 is provided with a cylindrical holder 53 which has a recess adapted to engage with a plunger 54 (described hereinafter).

The plunger 54 provided with a protrusion is adapted to move slideably within the housing 44 under the influence of resiliency of a spring 55 (described hereinafter) and a hydraulic pressure of oil introduced into the holder 53. The spring 55 exerts a resilient or spring force for urging the plunger 54 toward the rotor 52. A plunger oil passage 56 feeds the working oil for applying the hydraulic pressure to the plunger 54 against the spring force exerted by the spring 55. An air passage 57 is provided for setting constantly to the atmospheric pressure the space formed at the side of the plunger 54 at which the spring 55 is disposed.

The intake-side cam shaft 19 and the rotor 52 are connected fixedly to each other by means of a connecting bolt 58. On the other hand, the intake-side cam shaft 19 and the rotor 52 are interconnected by a rotatable shaft portion of a shaft member 59 which is mounted rotatably relative to the cover 47. An air passage 60 is formed so as to extend through the shaft member 59 and the intake-side cam shaft 19 for setting the inner space defined by the plate 50 to the atmospheric pressure.

FIG. 12 is a fragmentary sectional view showing a state in which a hydraulic pressure is applied to the plunger 54 by way of the plunger oil passage 56.

As can be seen in FIG. 12, the plunger 54 is forced to bear against the housing 44 with the spring 55 being compressed under the hydraulic pressure. As a result of this, the plunger 54 and the holder 53 are disengaged from each other to thereby allow the rotor 52 to rotate relative to the housing 44.

FIG. 13 is a sectional view taken along a line X—X in FIG. 11 as viewed in the direction indicated by arrows, FIG. 14 is a fragmentary sectional view for illustrating displacement of a slide plate 71, FIG. 15 is a sectional view taken along a line Y—Y in FIG. 11 as viewed in the direction indicated by arrows, and FIG. 16 is a sectional view taken along a line Z—Z in FIG. 11 as viewed in the direction indicated by arrows.

Referring to FIGS. 13 to 16, the bolts 48 are received screwwise in the bolt holes 61, respectively. There are provided sector-like retarding hydraulic chambers 62 for rotating first to fourth vanes 64 to 67, respectively, in a retarding direction, as described hereinafter. The vanes 64 to 67 mentioned above are formed integrally with the rotor 52.

The retarding hydraulic chambers 62 are defined in correspondence to the first to fourth vanes 64 to 67, respectively, being enclosed by the rotor 52, the casing 45, the cover 47 and the housing 44. Further, the retarding hydraulic chambers 62 are hydraulically communicated with the first oil passage 42 so as to be supplied with the working oil therefrom.

On the other hand, sector-like advancing hydraulic chambers 63 are provided for rotating the first to fourth vanes 64 to 67 in an advancing direction. The advancing hydraulic chambers 63 are defined in correspondence to the first to fourth vanes 64 to 67, respectively, being enclosed by the rotor 52, the casing 45, the cover 47 and the housing 44. Further, the advancing hydraulic chambers 63 are hydraulically communicated with the second oil passage 43, being supplied with the working oil therefrom.

With the arrangement described above, the rotor 52 is displaced relative to the housing 44 in dependence on the amount of working oil supplied to the retarding hydraulic chamber 62 and the advancing hydraulic chamber 63, whereby volumes of the retarding hydraulic chamber 62 and the advancing hydraulic chamber 63 are caused to change correspondingly.

The first vane 64 protrudes radially outwardly from the rotor 52. The holder 53 is fitted to the first vane 64 at the side facing the housing 44 with a communicating oil passage 70 (described hereinafter) being formed in the cover 47. A guide groove 72 (described hereinafter) is formed in an intermediate portion of each of the communicating oil passages 70. The plunger oil passage 56 extends from the guide groove 72 to the housing 44 through the holder 53.

Similarly, each of the second to fourth vanes 65 to 67 is so formed as to protrude from the rotor 52 outwardly in the radially direction. Further, a tip seal 73 (also described hereinafter) is provided at a portion of each of the first to fourth vanes 64 to 67, which portion is brought into contact with the casing 45.

A vane supporting member 68 constitutes a center portion of the rotor 52. Shoes 69 are provided, extending from the casing 45 inwardly in the radial direction. Each of the shoes 69 is provided with the bolt hole 61 for receiving screwwise the bolt 48 with the tip seal 49 being provided at the portion of the shoe 69 which is brought into contact with the vane supporting member 68.

The communicating oil passage 70 is communicated with the retarding hydraulic chamber 62 and the advancing hydraulic chamber 63 formed at both sides of the first vane 64, respectively. The slide plate 71 is movable within the guide groove 72 (described hereinafter) formed at an intermediate location of the communicating oil passage 70. At this juncture, it should be mentioned that the communicating oil passage 70 is divided or partitioned by the slide plate 71 so that no oil leakage can take place between the retarding hydraulic chamber 62 and the advancing hydraulic chamber 63.

With the arrangement described above, the slide plate 71 is caused to displace toward the advancing hydraulic chamber 63 when the hydraulic pressure within the retarding hydraulic chamber 62 is high (see FIG. 13). On the other hand, when the hydraulic pressure within the advancing hydraulic chamber 63 is high, the slide plate 71 is forced to move toward the retarding hydraulic chamber 62 (see FIG. 14).

As mentioned previously, the guide groove 72 is provided at an intermediate portion of the communicating oil passage 70, wherein the guide groove 72 is communicated at an intermediate portion thereof to the plunger oil passage 56.

Thus, when the slide plate 71 moves to the advancing hydraulic chamber 63 (see FIG. 13), the plunger oil passage 56 communicates with the retarding hydraulic chamber 62, whereas when the slide plate 71 moves to the retarding hydraulic chamber 62 (see FIG. 14), the plunger oil passage 56 is set to the state communicating with the advancing hydraulic chamber 63.

The tip seal 73 is provided in association with each of the first to fourth vanes 64 to 67 for preventing leakage of oil between the vanes and the casing 45. Parenthetically, it should be mentioned that arrows shown in FIGS. 13, 15 and 16 indicate the direction in which the variable valve timing mechanism 40 as a whole is rotated by means of the timing belt 23 and others.

Next, operations of the variable valve timing (VVT) mechanism 40 and the oil control valve (OCV) 80 will be described in concrete.

At first, in the state in which the operation of the engine 1 is stopped, the rotor 52 assumes a maximum retard position (i.e., the position at which the rotor 52 has been rotated to maximum relative to the housing 44 in the retarding direction), as is shown in FIG. 13.

In the state mentioned above, the hydraulic pressure of oil fed from the oil pump 91 to the oil control valve 80 is low (at the atmospheric pressure). Consequently, oil is supplied to neither the first oil passage 42 nor the second oil passage 43. Thus, no hydraulic pressure is applied to the plunger oil passage 56, as a result of which the plunger 54 is resiliently pressed against the holder 53 under the influence of the spring 55, as is shown in FIG. 11. Thus, the plunger 54 and the holder 53 engage with each other.

Upon starting of operation of the engine 1, the oil pump 91 is put into operation, whereby the hydraulic pressure fed to the oil control valve 80 rises up. Consequently, hydraulic medium or oil is fed to the retarding hydraulic chamber 62 by way of the A-port 86. As a result of this, the slide plate 71 is caused to move toward the advancing hydraulic chamber 63 under the hydraulic pressure prevailing within the retarding hydraulic chamber 62, whereby hydraulic communication is established between the retarding hydraulic chamber 62 and the plunger oil passage 56. Consequently, the plunger 54 is urged to displace toward the housing 44, as a result of which the plunger 54 and the rotor 52 are disengaged from each other.

However, because the hydraulic pressure is applied to the advancing hydraulic chamber 63, each of the first to fourth vanes 64 to 67 remains in the state bearing on the shoes 69 in the retarding direction under hydraulic pressure. Accordingly, even when the plunger 54 is disengaged, the housing 44 and the rotor 52 are pressed against each other under the hydraulic pressure within the retarding hydraulic chamber 62, whereby vibration or shock can be suppressed to a minimum.

Now, when the B-port 87 is opened to thereby cause the rotor 52 to rotate in the advancing direction, working oil is supplied to the advancing hydraulic chamber 63 by way of the second oil passage 43. Consequently, hydraulic pressure is transmitted to the communicating oil passage 70 from the advancing hydraulic chamber 63, as a result of which the slide plate 71 is caused to move toward the retarding hydraulic chamber 62 under the hydraulic pressure.

When the slide plate 71 is moved as mentioned above, the plunger oil passage 56 is placed in hydraulic communication with the advancing hydraulic chamber 63 by way of the communicating oil passage 70, whereby hydraulic pressure is transmitted to the plunger oil passage 56 from the advancing hydraulic chamber 63. Under the hydraulic pressure mentioned above, the plunger 54 is forced to move toward the housing 44 against the spring force exerted by the spring 55, which results in disengagement between the plunger 54 and the holder 53.

In this manner, by adjusting the amount of working oil by opening/closing the A-port 86 and the B-port 87 in the state where the plunger 54 and the holder 53 are disengaged from each other, rotation of the rotor 52 can be advanced or retarded relative to the rotation of the housing 44 owing to the adjustment or control of the amount of working oil within the retarding hydraulic chamber 62 and the advancing hydraulic chamber 63.

Next, by referring to FIGS. 17 and 19, typical operation of the oil control valve 80 will be described. Incidentally, FIGS. 17 to 19 show operating states of the oil control valve 80 when the control current i issued from the electronic control unit (ECU) 100 assumes different values, respectively.

More specifically, FIG. 17 shows operation state of the oil control valve 80 when the value of the control current i is ia (e.g. 0.1 ampere) smaller than a reference current value ib (e.g. 0.5 ampere).

Referring to FIG. 17, the spool valve element 82 is resiliently urged to the left-hand side of the housing 81 under the influence of the spring 84, whereby the oil supplying port 85 and the A-port 86 on one hand and the B-port 87 and the exhaust port 88b on the other hand are mutually communicated, as indicated by arrows.

In this state, working oil is fed to the retarding hydraulic chamber 62 while it is discharged from the advancing hydraulic chamber 63. Consequently, the rotor 52 is forced to rotate in the counterclockwise direction relative to the housing 44 as indicated by arrow. Thus, the phase of the intake-side cam shaft 19 is retarded relative to the intake timing pulley 21, whereby the intake valve 17 is placed in the retarding control state.

FIG. 18 shows the operation state of the oil control valve 80 when the value of the control current i is equal to the reference current value ib (e.g. 0.5 ampere). In the state illustrated in FIG. 18, the forces exerted by the linear solenoid 83 and the spring 84, respectively, and acting in opposite directions to each other are in balance, as a result of which the spool valve element 82 is maintained at a position where both the A-port 86 and the B-port 87 are closed.

Consequently, the retarding hydraulic chamber 62 and the advancing hydraulic chamber 63 are in the states in which working oil is neither supplied nor discharged. Accordingly, the rotor 52 will be sustained at the current position so long as the leakage of working oil does not occur from the retarding hydraulic chamber 62 and the advancing hydraulic chamber 63, whereby the phase relation between the intake timing pulley 21 and the intake-side cam shaft 19 can be maintained as it is.

FIG. 19 shows operation state of the oil control valve 80 when the value of the control current i is ic (e.g. 1.0 ampere) which is greater than the reference current value ib (e.g. 0.5 ampere).

Referring to FIG. 19, the spool valve element 82 is driven to the right-hand side of the housing 81 under the influence of the linear solenoid 83, whereby the oil supplying port 85 and the B-port 87 on one hand and the A-port 86 and the exhaust port 88a on the other hand are mutually communicated, as indicated by arrows.

In this state, working oil is fed to the advancing hydraulic chamber 63 through the second oil passage 43, while being discharged from the retarding hydraulic chamber 62 through the first oil passage 42. Consequently, the rotor 52 is forced to rotate in the clockwise direction relative to the housing 44 as indicated by arrow. Thus, the phase of the intake-side cam shaft 19 relative to the intake timing pulley 21 is caused to advance, whereby the intake valve 17 is placed in the advancing control state.

As can be seen from FIGS. 17 to 19, degree of hydraulic communication between the oil supplying port 85 and the A-port 86 or the B-port 87 as well as the degree of hydraulic communication between the exhaust port 88a or 88b and the A-port 86 or the B-port 87 can be controlled in dependence on the position of the spool valve element 82. In this conjunction, it is to be mentioned that the position of the spool valve element 82 and the value of the control current i flowing through the linear solenoid 83 bear a proportional relationship to each other.

FIG. 20 is a characteristic diagram for illustrating a relation between the value of the control current i flowing through the linear solenoid 83 and an actual valve timing change rate VTa. More specifically, there is graphically illustrated the rate of change of the actual valve timing (hereinafter also referred to as the actual valve timing change rate) designated by VTa as a function of the linear solenoid current i under predetermined operating condition of the engine 1. In FIG. 20, a positive or plus region of the actual valve timing change rate VTa represents displacement or shift in the advancing direction, while a negative or minus region of the actual valve timing change rate VTa corresponds to the region in which displacement or shift takes place in the retarding direction.

In FIG. 20, the electric current values ia to ic represent values of the linear solenoid current i corresponding to the positions of the spool valve element 82 shown in FIGS. 17, 18 and 19, respectively. As can be seen from the figures, the value of the linear solenoid current i at which the actual valve timing Ta does not change (i.e., VTa=0) is only one current value ib at which the amount of working oil leaking from the hydraulic chambers 62 and 63 as well as the hydraulic pipe and the spool valve element 82 is in balance with the amount of working oil fed under pressure from the oil pump 91.

FIG. 21 is a characteristic diagram illustrating variations in the relation between the control current i flowing through the linear solenoid and the actual valve timing change rate VTa, wherein a solid line curve represents the characteristic curve when the discharge pressure of working oil is relatively high while a broken line curve represents the characteristic curve when the discharge pressure of working oil is relatively low. In this conjunction, it is to be mentioned that the discharge pressure of working oil can vary in dependence on the engine rotation number NE and the temperature such as the cooling water temperature W.

As can be seen in FIG. 21, the reference current value ib changes constantly in dependence on the change in the discharge pressure of working oil. For instance, when the discharge pressure of working oil becomes low, the reference current value ib increases. Additionally, the manner in which the reference current value ib and hence the characteristic curve vary differs from one to another product such as the spool valve element 82 due to unevenness in the dimensional factor or the like. When the discharge pressure of working oil becomes low, the rate of change in the actual valve timing (i.e., the value VTa) relative to the change of the linear solenoid current i will decrease.

Hereinafter, the linear solenoid current ib at which the actual valve timing Ta can remain constant will be referred to as the holding current ih.

Ordinarily, when the valve timing is to be advanced, the linear solenoid current i may be set at a large value relative to the holding current ih. By contrast, when the valve timing is to be retarded, the linear solenoid current i may be set at a small value relative to the holding current.

Next, valve timing detecting operation will be described by reference to FIG. 22 which is a timing chart illustrating a crank angle signal SGT, a cam angle signal SGCd in the most retarded phase and a cam angle signal SGCa in the advanced phase. Phase relations between the crank angle signal SGT and the cam angle signals SGCd and SGCa as well as the actual valve timing Ta can be arithmetically determined on the basis of the timing chart shown in FIG. 22.

The electronic control unit (ECU) 100 is so designed or programmed as to measure a period T of the crank angle signal SGT as well as a phase difference time ΔTa intervening between the cam angle signal SGCa and the crank angle signal SGT (i.e., a time corresponding to difference in phase between the cam angle signal SGCa and the crank angle signal SGT).

Further, the most retarded valve timing Td is arithmetically determined in accordance with the undermentioned expression (1) on the basis of a phase difference time ΔTd and the period T of the crank angle signal SGT when the retard of the valve timing is at maximum.

$$Td = (\Delta Td/T) \times 180 [°CA] \quad (1)$$

The result of the calculation mentioned above is stored in a random access memory (RAM) incorporated in the electronic control unit 100.

Further, the electronic control unit 100 is programmed to determine arithmetically the actual valve timing Ta on the basis of the phase difference time ΔTa, the period T of the crank angle signal SGT and the most retarded valve timing Td in accordance with the following expression (2):

$$Ta = (\Delta Ta/T) \times 180[°CA] - Td \quad (2)$$

Furthermore, the electronic control unit 100 is so programmed as to make the actual valve timing Ta converge to a desired (or target) valve timing To through a feedback control of the linear solenoid current i on the basis of timing deviation or difference ER between the actual valve timing Ta and the desired valve timing To.

FIG. 23 is a block diagram showing schematically an internal configuration of the electronic control unit (ECU) 100. As can be seen in the figure, the electronic control unit 100 includes a microcomputer 101.

Referring to FIG. 23, the microcomputer 101 is comprised of a CPU (central processing unit) 102 for performing various arithmetic operations, decision processings and others, a ROM (read-only memory) 103 for storing previously a predetermined control program or programs or the like, a RAM (random access memory) 104 for storing temporarily the results of arithmetic operations and/or other processings executed by the CPU 102, an A/D (analogue-to-digital) converter 105 for converting an analogue signal to a digital signal, a counter 106 for counting the period of an input signal, a timer 107 for measuring a driving time period of an output signal, an output port 108 constituting an output interface, and a common bus 109 for interconnecting the various blocks or components 102 to 108 mentioned above.

Provided in association with the microcomputer 101 is a first input circuit 110 which shapes the waveforms of the crank angle signal SGT supplied from the crank angle sensor 6 and the cam angle signal SGC supplied from the cam angle sensor 24, wherein the output signal of the first input circuit 110 is supplied to the microcomputer 101 as an interrupt command signal INT.

Every time the interruption occurs in response to the interrupt command signal INT, the CPU 102 reads the value of the counter 106 to store it in the RAM 104.

Further, the CPU 102 arithmetically determines the period T of the crank angle signal SGT (see FIG. 22) on the basis of difference between the counter value at the time point when the preceding crank angle signal SGT was inputted and the current counter value to thereby determine the engine rotation number (rpm) NE on the basis of the period T of the crank angle signal SGT.

Furthermore, the CPU 102 reads from the RAM 104 the counter value in response to the input of the cam angle signal SGC, to thereby determine arithmetically a phase difference time ΔT on the basis of the difference or deviation from the counter value at the time point the crank angle signal SGT was inputted.

Further provided in association with the microcomputer 101 is a second input circuit 111 for fetching the cooling water temperature W from the water temperature sensor 12, the throttle opening degree θ from the throttle sensor 27 and the intake air flow Q from the intake air-flow sensor 28, respectively, wherein the output signal of the second input circuit 111 undergone noise elimination processing, amplification and other processings is supplied to the A/D converter 105 which converts the signals representing the cooling water temperature W, the throttle opening degree θ and the intake air flow Q into corresponding digital data, respectively. The digital output data signals of the A/D converter 105 are in turn inputted to the CPU 102.

The driving circuit 112 is designed to output a control signal for driving the fuel injector 30, while the driving circuit 113 outputs a control signal for driving the ignitor 11. In response to the various input signals, the CPU 102 arithmetically determines the driving time or duration for the fuel injector 30 as well as the ignition timing for the ignitor 11 on the basis of the input signals, while driving the fuel injector 30 and the ignitor 11 by way of the output port 108 and the driving circuits 112 and 113 controlling the fuel injection quantity and the ignition timing, respectively.

The current control circuit 114 is designed to control the linear solenoid current i of the oil control valve 80. To this end, the CPU 102 determines arithmetically the value of the linear solenoid current i of the oil control valve 80 on the basis of the various input signals mentioned above to thereby output through the output port 108 a duty signal corresponding to the linear solenoid current i for the oil control valve 80 on the basis of the result of time measurement performed by the timer 107.

On the other hand, the current control circuit 114 controls flowing of the linear solenoid current i through the linear solenoid 83 of the oil control valve 80 in accordance with the duty signal mentioned above, to thereby control the valve timing.

Further provided is a power circuit 115 which is designed to generate a constant voltage from the voltage of a battery 116 as supplied via a key switch 117. Thus, the microcomputer 101 can operate with the constant voltage supplied from the power circuit 115.

Next, operations of the CPU 102 will be described in concrete by referring to FIGS. 24 to 26 in which FIG. 24 is a timing chart when the actual holding current ih coincides with the reference value (0.5 ampere) and FIG. 25 is a timing chart when the actual holding current ih is deviated in the increasing direction from the reference value (0.5 ampere) in the system on the presumption that no integral control means is provided, while FIG. 26 is a timing chart in the case where the actual holding current ih is deviated in the increasing direction from the reference value (0.5 ampere) on the presumption that the integral control means is provided.

In general, the oil control valve (OCV) 80 is so designed as to be capable of adjusting or regulating the quantity of working oil to be fed per unit time, whereas for the variable valve timing mechanism 40 which is subject to the control, the angular displacement is determined on the basis of the integrated quantity or amount of working oil as supplied. To this end, the variable valve timing mechanism 40 is equipped with an integrating element.

Thus, when the actual holding current ih of the oil control valve 80 coincides with the reference value (0.5 ampere), the control means incorporated in the electronic control unit 100 performs the proportional control in dependence on the timing deviation ER between the desired valve timing To and the actual valve timing Ta by reference to the reference value (0.5 ampere) to thereby cause the actual valve timing Ta to converge to the desired valve timing To. In that case, the linear solenoid current i of the oil control valve 80 can be given by the following expression (3):

$$= KP \times ER + 0.5[A] \quad (3)$$

In the above expression (3), the gain KP corresponds to the proportional action. Further, the timing deviation or error ER appearing in the expression (3) can be determined in accordance with the following expression (4):

$$ER = To - Ta \quad (4)$$

In this conjunction, time-dependent changes of the desired valve timing To, the actual valve timing Ta and linear solenoid current i are, respectively, such as illustrated in FIG. 24.

At this conjuncture, it should be mentioned that the actual holding current ih for the oil control valve 80 can not always coincide with the reference value (0.5 ampere). Consequently, when the actual holding current ih becomes greater than the reference value (0.5 ampere), i.e., when the actual holding current ih deviates higher from the reference value, the control in accordance with the expression (3) will result in that the actual valve timing Ta does not converge to the desired valve timing To as illustrated in FIG. 25 and thus an offset ER1 continues to remain ultimately.

Such being the circumstances, the control means incorporated in the electronic control unit 100 is designed to control the linear solenoid current i of the oil control valve 80 so that the timing deviation ER becomes zero. More specifically, referring to FIG. 25, the control means controls the linear solenoid current i in accordance with the undermentioned expression (3A) in order to make the offset ER1 to be zero.

$$i = KP \times ER1 + 0.5 [A] \tag{3A}$$

At this juncture, it is noted that the actual holding current ih is deviated in the increasing direction from the reference current value ib (0.5 ampere) by an amount "KP×ER1 (ampere)". Thus, the control means will try to converge the actual valve timing Ta to the desired valve timing To by supplying the current greater than the reference value (0.5 ampere) by "KP×ER1 (ampere)" in an effort to zeroing the offset ER1.

In actuality, however, the oil control valve 80 is in the state shown in FIG. 18 with both the A-port 86 and the B-port 87 being closed, which means that the offset ER1 is never cleared but continues to remain. In that case, the offset ER1 can be given by $$ER1 = (ih - 0.5[A])/KP \tag{5}$$

Under the circumstances, the prior art system is so designed as to perform the integral control action in addition to the proportional control action according to the expression (3) so that no offset ER1 continues to exist.

In that case, the linear solenoid current i is given by the following expression (6):

$$i = KP \times ER + \Sigma Ki + 0.5 [A] \tag{6}$$

In the above expression (6), the gain Ki corresponds to the integral action. Further, the integral term (total sum term) ΣKi represents the integral correcting value resulting from integration of increments/decrements calculated on the basis of the timing deviation ER in accordance with the following expression (7):

$$\Sigma Ki = \Sigma Ki(j-1) + Ki \times ER \tag{7}$$

In the above expression (7), the integral term "Σki(j−1)" represents the integral correcting value before determining the current integral value, while the term "Ki×ER" corresponds to the current integral incrementation/decrementation value. Parenthetically, it should be mentioned that the gain Ki is set at a very small value so that the integral correcting value ΣKi does not fluctuate significantly even when the timing deviation ER making appearance transiently upon stepwise response increases, to thereby protect the control against instability.

Unless the offset ER1 exists between the desired valve timing To and the actual valve timing Ta, the integral correcting value ΣKi resulting ultimately from the integral control will satisfy the relation given by the following relation expression (8) for the holding current ih.

$$ih \approx \Sigma Ki + 0.5 [A] \tag{8}$$

FIG. 26 is a view illustrating temporal changes of the desired valve timing To, the actual valve timing Ta and the linear solenoid current i, respectively, in the state satisfying the condition given by the above expression (8). As can be seen, the timing deviation ER converges to zero.

Next, referring to FIGS. 27 to 29, description will be directed to the valve timing control performed by the conventional system equipped with the integral control means in accordance with the previously mentioned expression (6).

FIGS. 27 and 28 are flow charts illustrating control programs stored in the ROM 103 (see FIG. 23). Further, FIG. 29 is a timing chart for illustrating the valve timing control operation performed in accordance with the programs illustrated in FIGS. 27 and 28. More specifically, in FIG. 29, temporal changes of the actual valve timing Ta, the linear solenoid current i and the integral correcting value ΣKi are illustrated.

The routine shown in FIG. 27 is executed by the CPU 102 periodically at a predetermined time interval (e.g. upon every lapse of 25 msec), while the routine shown in FIG. 28 is executed only once immediately upon closing of the key switch 117.

Referring to FIG. 27, the CPU 102 fetches the output signals from the various sensors mentioned hereinbefore in a step S1. In more concrete, the CPU 102 fetches the operation state signals of the engine such as the crank angle signal SGT, the cam angle signal SGC, the intake air flow Q, the throttle opening degree θ and other from the crank angle sensor 6, the cam angle sensor 24, the intake air-flow sensor 28, the throttle sensor 27, the water temperature sensor 12 and other, respectively, to thereby arithmetically determine the period T of the crank angle signal, the engine rotation number NE and the phase difference time ΔT on the basis of the operation state signals mentioned above.

Subsequently, the CPU 102 determines arithmetically the actual valve timing Ta represented by the angular displacement of the intake-side cam shaft 19 relative to the crank shaft 5 on the basis of the crank angle signal period T and the phase difference time ΔT in accordance with the previously mentioned expression (2) in a step S2.

Furthermore, the CPU 102 arithmetically determines or calculates the desired valve timing To on the basis of the engine rotation number NE, the intake air flow Q, the throttle opening degree 6 and the cooling water temperature W in a step S3.

In succession, the timing deviation ER of the actual valve timing Ta from the desired valve timing To is arithmetically determined in accordance with the expression (4) in a step S4, which is then followed by computation of the integral correcting value ΣKi in accordance with the expression (7) mentioned hereinbefore in a step S5.

In this conjunction, the term ΣKi(j−1) appearing in the expression (7) represents the integral correcting value ΣKi at a time point preceding to the current time point by 25 msec.. Incidentally, the integral correcting value ΣKi is initialized to zero immediately after power-on of the electronic control unit 100 with the key switch 117 being closed (see step S8 in FIG. 28).

Finally, the linear solenoid current i for the oil control valve 80 is arithmetically determined in accordance with the expression (6) mentioned hereinbefore in a step S6, whereby a control signal (duty signal) corresponding to the linear solenoid current i is generated on the basis of the result of time measurement performed by the timer 107 to be outputted through the output port 108 (step S7), whereon the routine shown in FIG. 27 comes to an end.

The duty signal outputted from the microcomputer 101 via the output port 108 is inputted to the oil control valve (OCV) 80 by way of the current control circuit 114 to be used for controlling the current flowing through the spool valve element 82 incorporated in the oil control valve 80 so that it coincides with the linear solenoid current i.

In this manner, the actual valve timing Ta is so controlled as to become equal to the desired valve timing To.

However, in the conventional valve timing control system described above, the timing deviation ER will continue to exist in succession to the power-on of the electronic control unit 100 over a time period taken for the integral correcting value ΣKi to increase from zero (initialized state) to the value which can satisfy the condition given by the expression (8) mentioned hereinbefore. Consequently, during the period for which the timing deviation ER continues to remain, the operation performance inclusive of the exhaust gas discharge performance of the internal combustion engine will be degraded.

Particularly, when the timing deviation ER continues to be effective to sustain the overlap state in which both the intake valve 17 and the exhaust valve 18 are opened (hereinafter referred to also as the valve overlap), burning or combustion of the air-fuel mixture within the combustion chamber 8 becomes unstable, which may unwantedly lead to occurrence of misfire and/or stall of the engine.

Further, the linear solenoid current i (control quantity) for holding the phase of the variable valve timing mechanism 40 is corrected on the basis of the integral correcting value ΣKi immediately after the power-on. However, the initial value of the linear solenoid current i is set at 0.5 ampere with that of the integral correcting value ΣKi being set at "0" (zero) (see FIG. 30).

Thus, when the actual valve timing Ta of the intake valve 17 is, for example, retarded relative to the desired valve timing To, the actual valve timing Ta is caused to advance in excess temporarily beyond the desired valve timing To, i.e., occurrence of overshoot, as can be seen in FIG. 30. As a result of this, the period of the valve overlap will be extended, which will bring about degradation of the combustion performance or combustibility.

Such being circumstances, there has been proposed an approach for avoiding occurrence of the overshoot that a learned value is adopted as a control quantity for holding the phase of the variable valve timing mechanism 40 and the initial value of the learned value is set to such a value which can reduce the valve overlap, as is disclosed, for instance, in Japanese Unexamined Patent Application Publication No. 338271/1996 (JP-A-8-338271).

When the initial value of the learned value is set in this way, the initial value of the linear solenoid current i (control quantity) e.g. for the intake valve 17 is set at a value smaller than 0.5 ampere so that the valve opening timing is retarded.

Thus, when the learned value converges to a value greater than 0.5 ampere, initial timing deviation between the desired valve timing To and the actual valve timing Ta will increase, as a result of which lots of time will be taken for the actual valve timing Ta to coincide with the desired valve timing To to allow the learning to be completed.

Further, in general, the integral correcting value ΣKi is limited to a value within a predetermined range for avoiding correction in excess due to setting of an abnormal value. In that case, however, when the actual valve timing Ta can not change because of occurrence of some abnormality, the integral correcting value ΣKi may remain fixed at an upper limit value α or a lower limit value β of the predetermined range mentioned above.

FIG. 31 shows time-dependent changes of the linear solenoid current i and the integral correcting value in the case where the variable valve timing mechanism 40 or the oil control valve 80 does not work at all over a fault occurrence period Γ after lapse of which a normal operation state is restored.

In the fault occurrence period Γ (abnormality occurrence state (i.e., operation state in which abnormality is occurring)), the linear solenoid current i and the integral correcting value ΣKi rise up to the respective maximum values and remain constant thereat.

Subsequently, when the variable valve timing mechanism 40 or the coil control valve 80 is restored to the normal operation state and the actual valve timing Ta starts to advance toward the desired valve timing To, the linear solenoid current i starts to lower from the maximum value, i.e., 1 ampere.

On the other hand, the integral correcting value ΣKi remains fixed at the upper limit value Γ over a time duration γ and then starts to lower gradually after the actual valve timing Ta has advanced to the desired valve timing To.

Subsequently, the actual valve timing Ta remains in the overshoot state where the actual valve timing Ta exceeds the desired valve timing To in the advancing direction over a time period until the integral correcting value ΣKi has converged to "0" (zero).

As will be appreciated from the above, immediately after the integral correcting value ΣKi starts to change upon restoration of the normal operation state from the abnormality occurrence state, the actual valve timing Ta can not be converged speedily to the desired valve timing To, causing the overshoot state to continue for an extended time. As a result of this, degradation of operation performance of the engine and deterioration in quality of the exhaust gas will be incurred.

As will now be appreciated from the foregoing description, the conventional valve timing control system for the internal combustion engine suffers degradation of the engine operation performance such as typified by occurrence of misfire and engine stall as well as deterioration of the exhaust gas because the timing deviation ER between the actual valve timing Ta and the desired valve timing To continues to remain for a while immediately after the power-on of the electronic control unit 100, as can be seen in FIG. 29, since the integral correcting value ΣKi is initialized to zero every time the key switch 117 is turned on or closed (step S8).

Furthermore, even when the initial value of the learned value is set to a smaller value than the median (0.5 ampere) in design, as taught in Japanese Unexamined Patent Application Publication No. 338271/1996 (JP-A-8-338271) cited previously, the timing deviation will still continue to exist so long as the learned value is not determined definitely. Besides, when the control quantity for holding the phase of the variable valve timing mechanism 40 is greater than the median in design, a lot of time is required for the learning process, giving rise to a problem that degradation of the driving performance or drivability and deterioration in quality of the exhaust gas are incurred.

SUMMARY OF THE INVENTION

In the light of the state of the art described above, it is an object of the present invention to provide a valve timing control system for an internal combustion engine which system is capable of making the actual valve timing converge speedily to the desired valve timing regardless of initialization of the control quantities performed immediately after power-on of the control system, to thereby suppress effectively and positively degradation of the engine operation performance as well as deterioration of the exhaust gas quality.

It is another object of the present invention to provide a valve timing control system for an internal combustion engine which is capable of suppressing overshoot of the actual valve timing and hence can suppress continuous existence of a timing deviation which provides a cause for aggravation of the valve overlap phenomenon, for thereby protecting the operation performance of the engine against degradation while protecting the exhaust gas quality against deterioration.

In view of the above and other objects which will become apparent as the description proceeds, there is provided according to a general aspect of the present invention a valve timing control system for an internal combustion engine, which system includes an intake valve and an exhaust valve driven in synchronism with rotation of the internal combustion engine for opening and closing an intake passage and an exhaust passage, respectively, which are communicated to a combustion chamber of the internal combustion engine, an operation state detecting means for detecting operation state of the internal combustion engine, a desired valve timing arithmetic means for arithmetically determining a desired valve timing for at least one of the intake valve and the exhaust valve in dependence on the engine operation state as detected, a variable valve timing mechanism for changing open/close timing for at least one of the intake valve and the exhaust valve, an actual valve timing detecting means for detecting an actual valve timing of at least one of the intake valve and the exhaust valve, an actual valve timing control means for generating a control quantity for the variable valve timing mechanism so that a timing deviation of the actual valve timing from the desired valve timing becomes zero, an integral control means for arithmetically determining an integral correcting value by integrating the timing deviation for thereby correcting the control quantity, an initializing condition detecting means for detecting as an initializing condition an engine operation state in which the integral correcting value is to be initialized, and an initializing means for initializing the integral correcting value to an optimum value conforming with the engine operation state when the initializing condition is detected, wherein the initializing means is so designed as to set an initial value of the integral correcting value to a negative value.

By virtue of the arrangement of the valve timing control system described above, the actual valve timing can be made to converge speedily to the desired valve timing regardless of initialization of the control quantities performed immediately after power-on of the electronic control unit. Besides, overshoot of the actual valve timing can be avoided, and hence continuous existence of a timing deviation which provides a cause for aggravation of the valve overlap event can be suppressed. Thus, not only the operation performance of the engine but also the exhaust gas quality can be protected against degradation, to great advantage.

In a preferred mode for carrying out the invention, the integral control means may include a limiting means for limiting the integral correcting value to a value within a predetermined range, wherein the initializing means may be so designed as to set the initial value within a range extending from a lower limit value of the predetermined range mentioned above to "0" inclusive.

By virtue of the above arrangement, the initial value of the integral correcting value can be set optimally.

In another preferred mode for carrying out the invention, the initializing means may be so designed as to set the initial value of the integral correcting value to the lower limit value of the predetermined range.

Owing to the arrangement described above, occurrence of the timing deviation as well as continuous existence thereof which tends to aggravate the valve overlap phenomenon can be suppressed positively and effectively.

In yet another preferred mode for carrying out the invention, the initializing condition detecting means may be so designed as to detect as the initializing condition a timing at which the integral correcting value changes for the first time after it has remained coincident with an upper limit value or the lower limit value of the predetermined range continuously for a predetermined time period.

With the arrangement described above, it is possible to converge the actual valve timing speedily to the desired valve timing even when the control quantities are initialized immediately after restoration of the operation state from the abnormality occurrence state to the normal state. Additionally, continuous existence of a timing deviation which provides a cause for aggravation of the valve overlap event can be suppressed positively and effectively.

In still another preferred mode for carrying out the invention, the initializing condition detecting means may be so designed as to detect as the initializing condition a timing which succeeds immediately to start of power supply to the valve timing control system.

By virtue of the arrangement of the valve timing control system described above, it is possible to cause the actual valve timing to converge speedily to the desired valve timing regardless of initialization of the control quantities performed immediately after the power-on of the electronic control unit. Besides, overshoot of the actual valve timing can be avoided, and thus continuous existence of a timing deviation which provides a cause for aggravation of the valve overlap event can be suppressed positively and effectively. In this way, not only the operation performance of the engine but also the exhaust gas quality can be protected against degradation.

In a further preferred mode for carrying out the invention, the valve timing control system may further include a learning means for learning as a learned value a control quantity required for holding the actual valve timing on the basis of the integral correcting value, wherein the initializing means may be so designed as to set an initial value of the learned value to a median in design while setting an initial value of the integral correcting value to a negative value when the learned value has not been determined yet, whereas when the learned value is available, the initializing means sets the initial value of the integral correcting value to "0".

With the arrangement described above, the actual valve timing can speedily be converged to the desired valve timing when the control quantities are initialized immediately after restoration of the operation state from the abnormality occurrence state to the normal state. Additionally, continuous existence of a timing deviation which provides a cause for aggravation of the valve overlap phenomenon can be suppressed positively with enhanced reliability.

In a yet further preferred mode for carrying out the invention, the integral control means may be comprised of a limiting means for limiting the integral correcting value to a value within a predetermined range, wherein the initializing means may be so designed as to set the initial value within a range extending from a lower limit value of the predetermined range to "0" inclusive.

With the arrangement described above, the initial value of the integral correcting value can be optimized.

In a still further preferred mode for carrying out the invention, the initializing means may be so designed as to set the initial value of the integral correcting value to the lower limit value of the predetermined range.

With the arrangement described above, occurrence of the timing deviation as well as continuous existence thereof which contributes to aggravation of the valve overlap event can be suppressed with much enhanced reliability.

In another preferred mode for carrying out the invention, the integral control means may be comprised of a limiting means for limiting the integral correcting value such that a sum of the integral correcting value and the learned value can assume a value within a predetermined range, wherein the initializing means may be so designed as to set an initial value of the sum to a value within a range extending from the lower limit value of the predetermined range mentioned above to "0" inclusive.

With the arrangement described above, further optimization of the initial value of the integral correcting value can be accomplished.

In yet another preferred mode for carrying out the invention, the initializing means may be so designed as to set the initial value of the sum to the lower limit value of the predetermined range mentioned above.

With the arrangement described above, occurrence of the timing deviation as well as continuous existence thereof which contributes to aggravation of the valve overlap event can be suppressed with enhanced reliability.

In still another preferred mode for carrying out the invention, the initializing condition detecting means may be so designed as to detect as the initializing condition a timing at which the integral correcting value changes for the first time after it has remained coincident with an upper limit value or the lower limit value of the predetermined range mentioned previously continuously for a predetermined time.

With the arrangement described above, it is possible to converge the actual valve timing speedily to the desired valve timing when the control quantities are initialized immediately after restoration of the operation state from the abnormality occurrence state to the normal state. Additionally, continuous existence of a timing deviation which provides a cause for aggravation of the valve overlap event can be suppressed positively and effectively.

In a further preferred mode for carrying out the invention, the initializing condition detecting means may be so designed as to detect as the initializing condition a timing at which the sum value mentioned previously changes for the first time after it has remained coincident with an upper limit value or the lower limit value of the aforementioned predetermined range continuously for a predetermined time.

With the arrangement described above, the actual valve timing can speedily be converged to the desired valve timing when the control quantities are initialized immediately after restoration of the operation state from the abnormality occurrence state to the normal state. Besides, continuous existence of a timing deviation which provides a cause for aggravation of the valve overlap event can be suppressed positively and effectively.

In a yet further preferred mode for carrying out the invention, the initializing condition detecting means may be so designed as to detect as the initializing condition a timing which succeeds immediately to start of power supply to the valve timing control system.

By virtue of the arrangement of the valve timing control system described above, it is possible to make the actual valve timing converge speedily to the desired valve timing regardless of initialization of the control quantities performed immediately after the power-on of the system. Besides, overshoot of the actual valve timing can be avoided, and thus continuous existence of a timing deviation which provides a cause for aggravation of the valve overlap event can be suppressed positively and effectively. In this way, not only the operation performance of the engine but also the exhaust gas quality can be protected against degradation.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
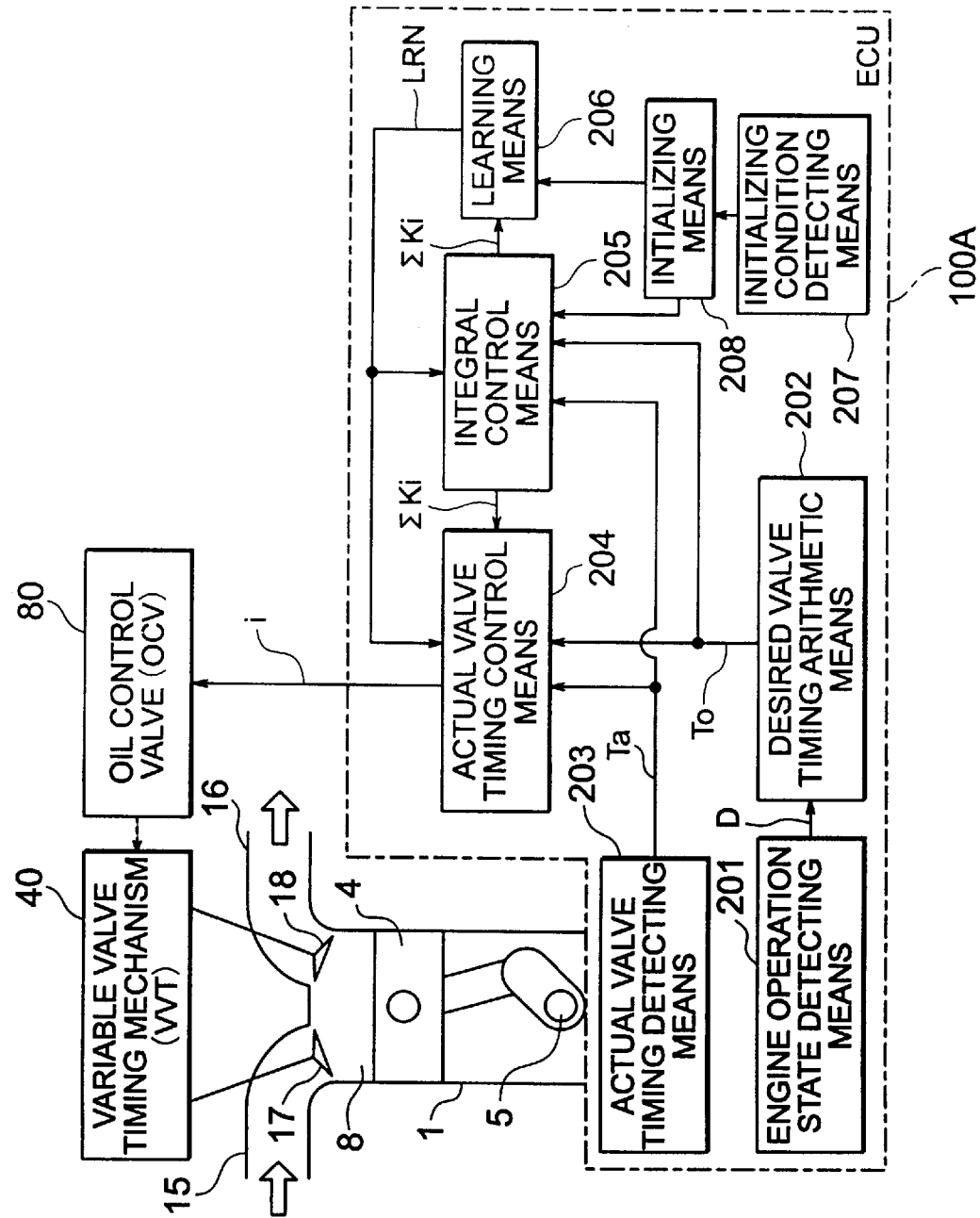
FIG. 1 is a functional block diagram showing conceptually and schematically a basic configuration of an internal combustion engine system equipped with a valve timing control system according to an embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Now, the valve timing control system for the internal combustion engine according to a first embodiment of the present invention will be described.

FIG. 1 is a functional block diagram showing conceptually and only schematically a basic configuration of an internal combustion engine system equipped with the valve timing control system according to the first embodiment of the invention. More specifically, various functional modules which may be realized by programs executed internally of an electronic control unit (ECU) 100A which constitutes a major part of the valve timing control system are illustrated in FIG. 1.

Figure 10:
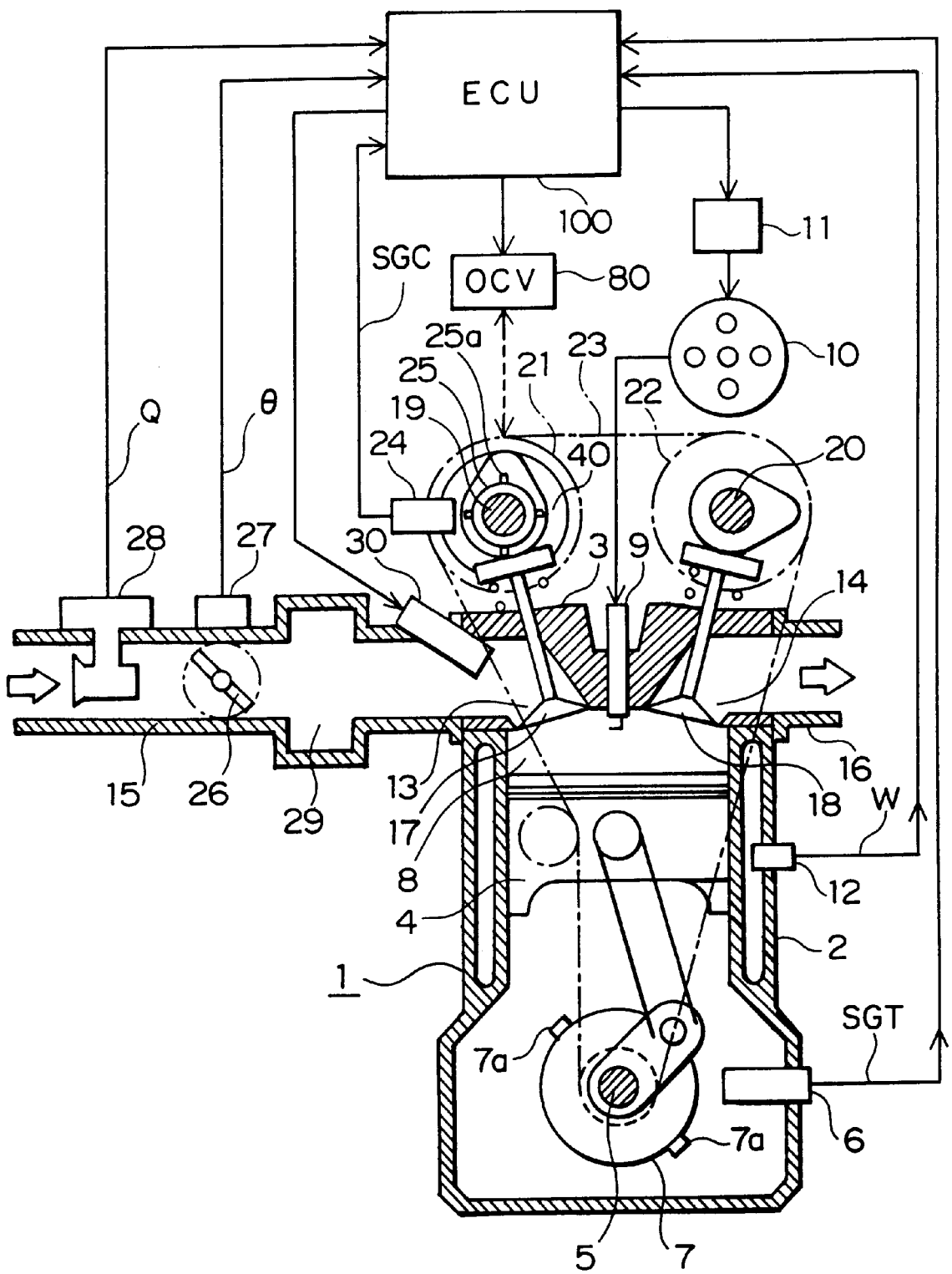
FIG. 10 is a schematic diagram showing generally a configuration of a gasoline engine system equipped with a conventional variable valve timing mechanism known heretofore.
Figure 11:
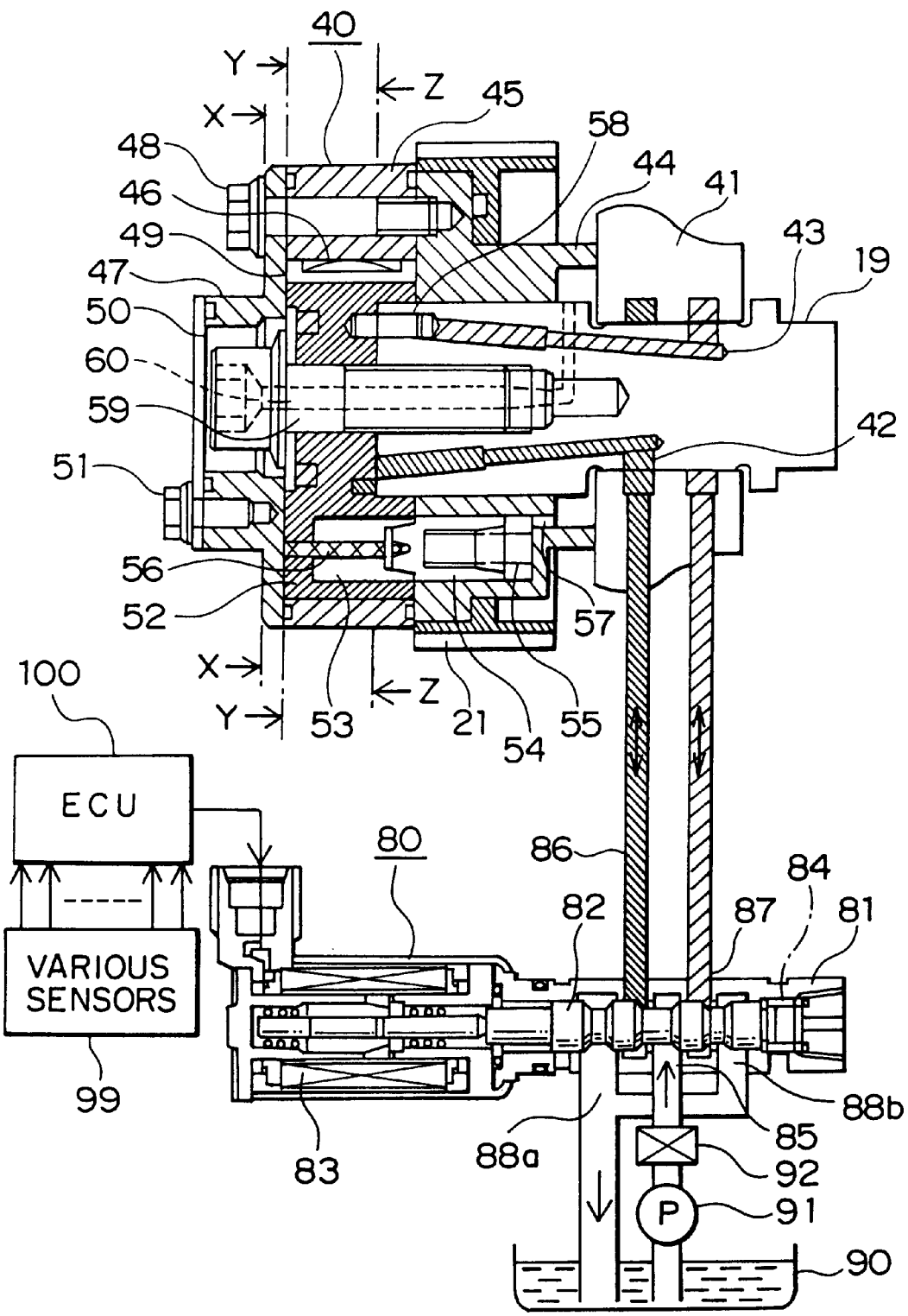
FIG. 11 is a side elevational view showing partially in section structures of a conventional variable valve timing mechanism and a conventional oil control valve.
Figure 12:
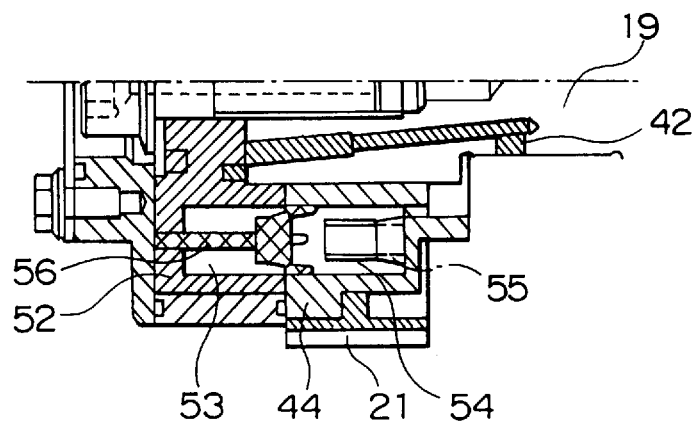
FIG. 12 is a fragmentary sectional view for illustrating operation of the conventional variable valve timing mechanism shown in FIG. 11.
Figure 13:
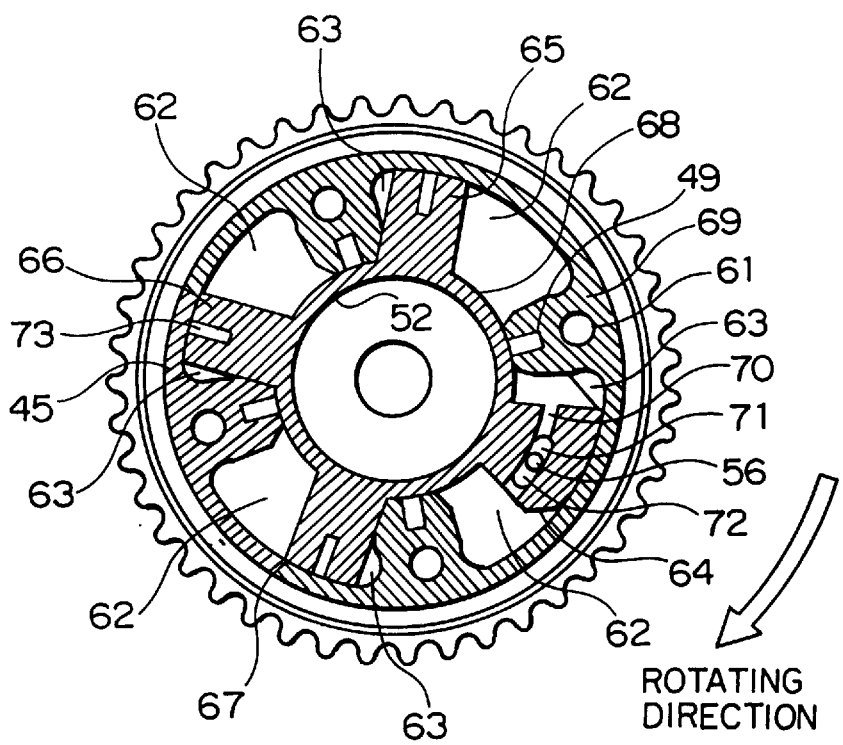
FIG. 13 is a sectional view taken along a line X—X in FIG. 11 and viewed in the direction indicated by arrows.
Figure 14:
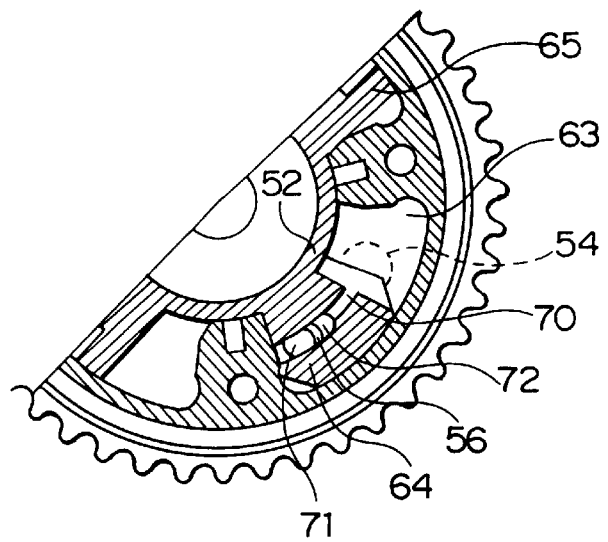
FIG. 14 is a fragmentary sectional view for illustrating displacement of a slide plate constituting a part of the conventional variable valve timing mechanism shown in FIG. 11.
Figure 15:
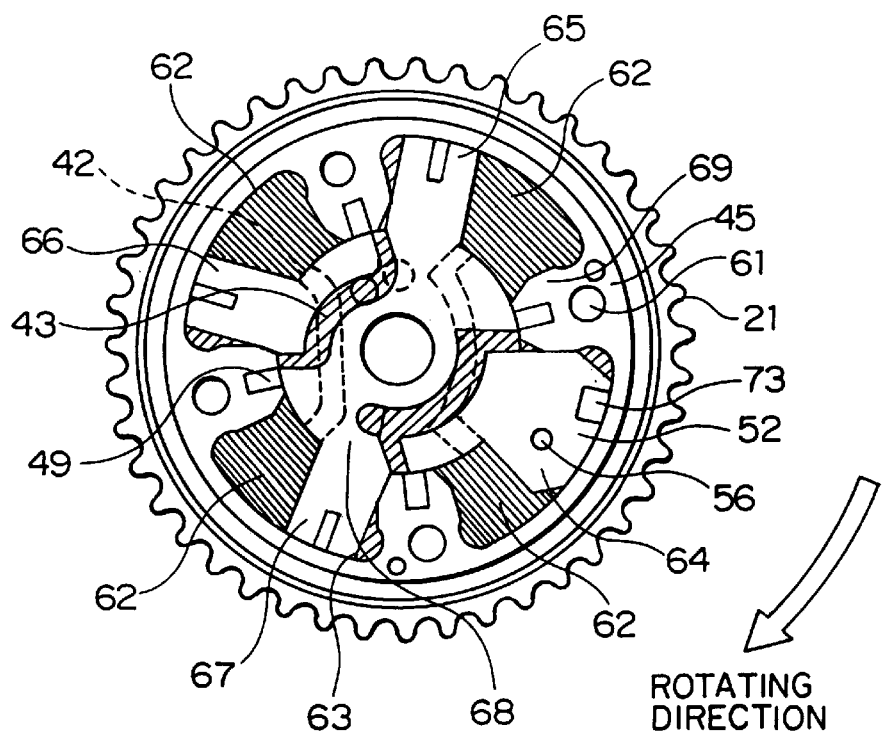
FIG. 15 is a sectional view taken along a line Y—Y in FIG. 11 and viewed in the direction indicated by arrows.
Figure 16:
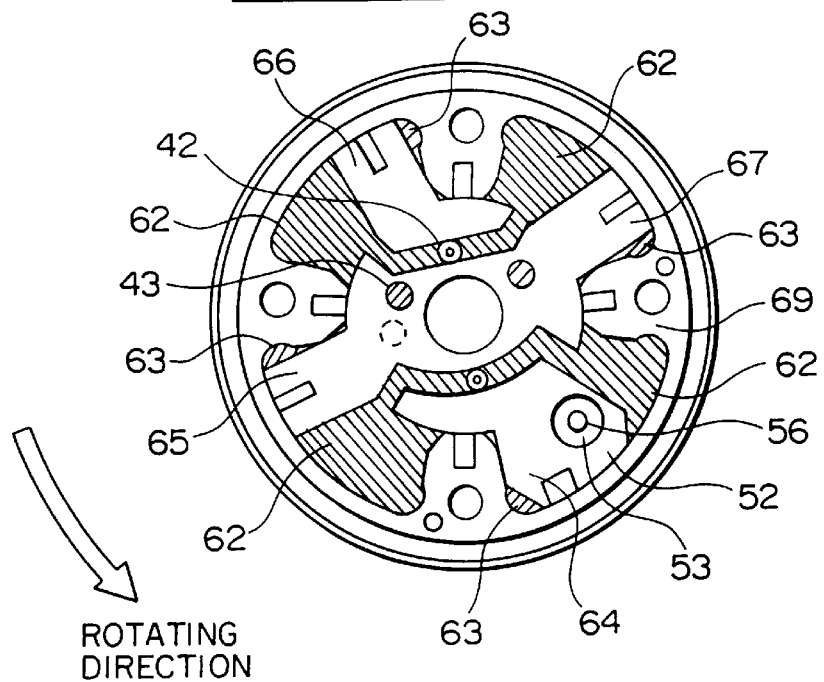
FIG. 16 is a sectional view taken along a line Z—Z in FIG. 11 and viewed in the direction indicated by arrows.
Figure 17:
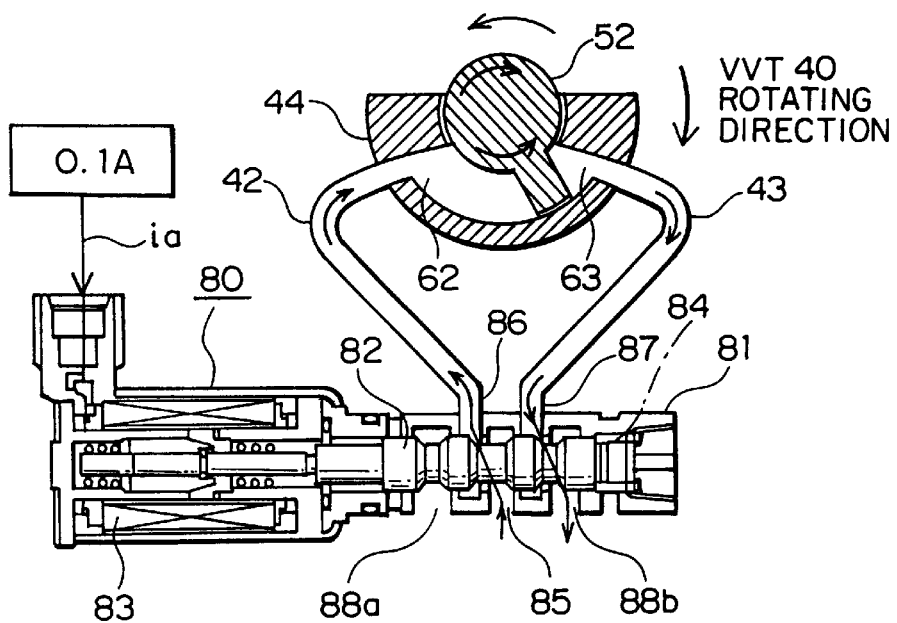
FIG. 17 is a view for illustrating operation of the conventional oil control valve in the case where a control current therefor is smaller than a reference value.
Figure 18:
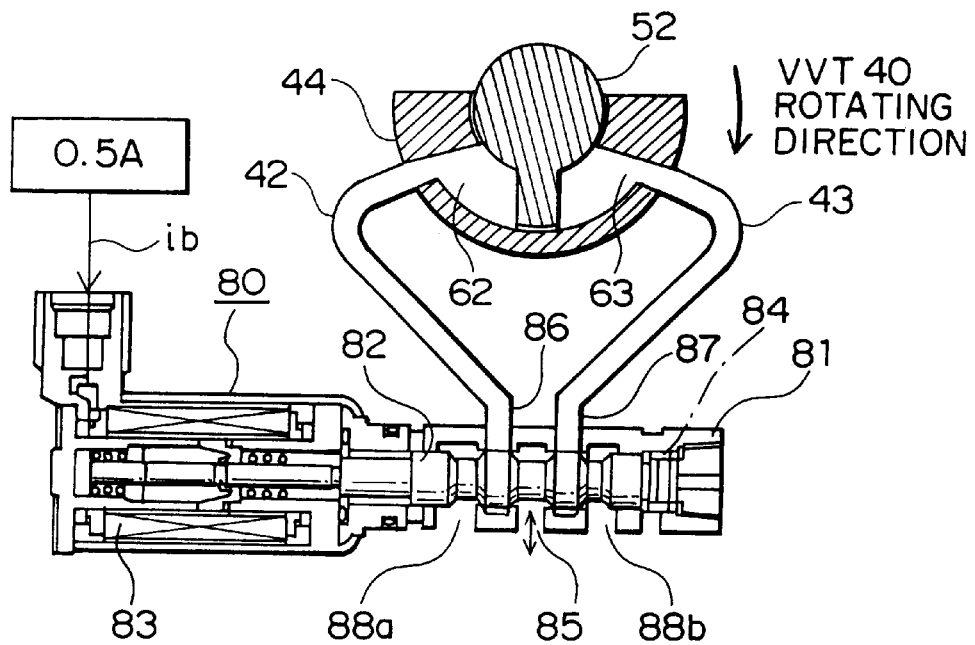
FIG. 18 is a view for illustrating operation of the conventional oil control valve in the case where the control current therefor is equal to the reference value.
Figure 19:
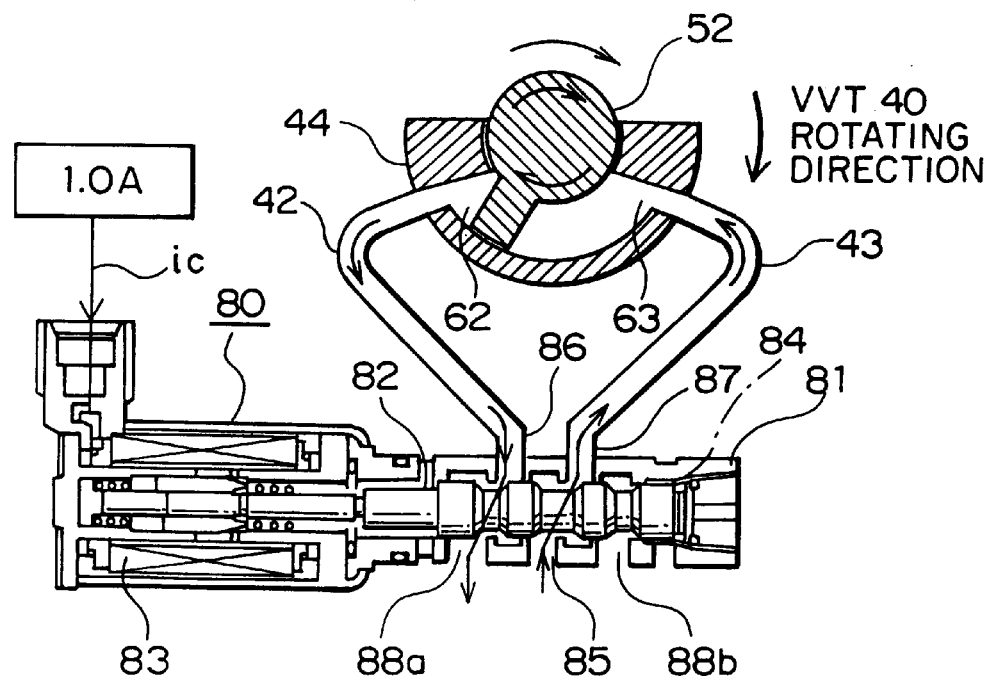
FIG. 19 is a view for illustrating operation of the conventional oil control valve in the case where the control current therefor is greater than the reference value.
Figure 20:
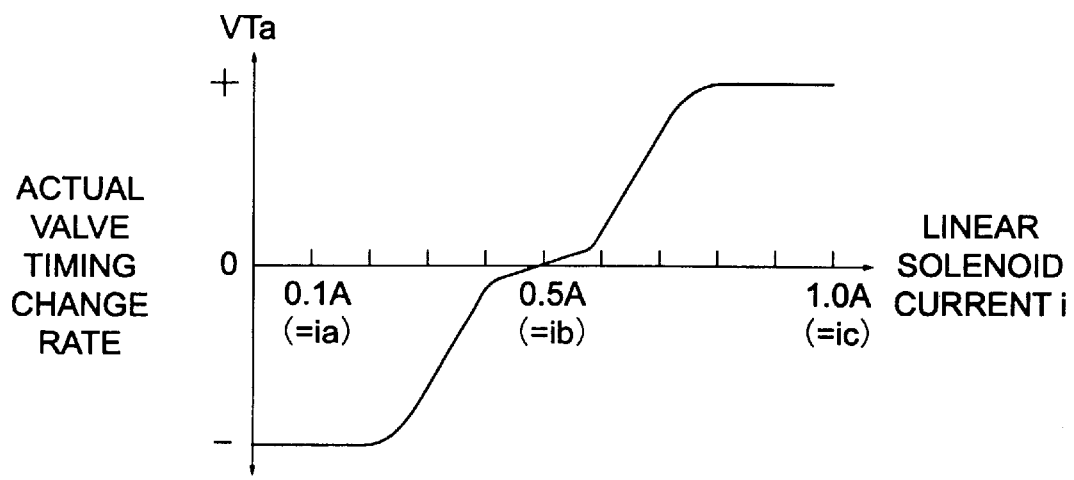
FIG. 20 is a characteristic diagram for illustrating a relation between the control current flowing through a linear solenoid of a conventional oil control valve and rate of change in the actual valve timing.
Figure 21:
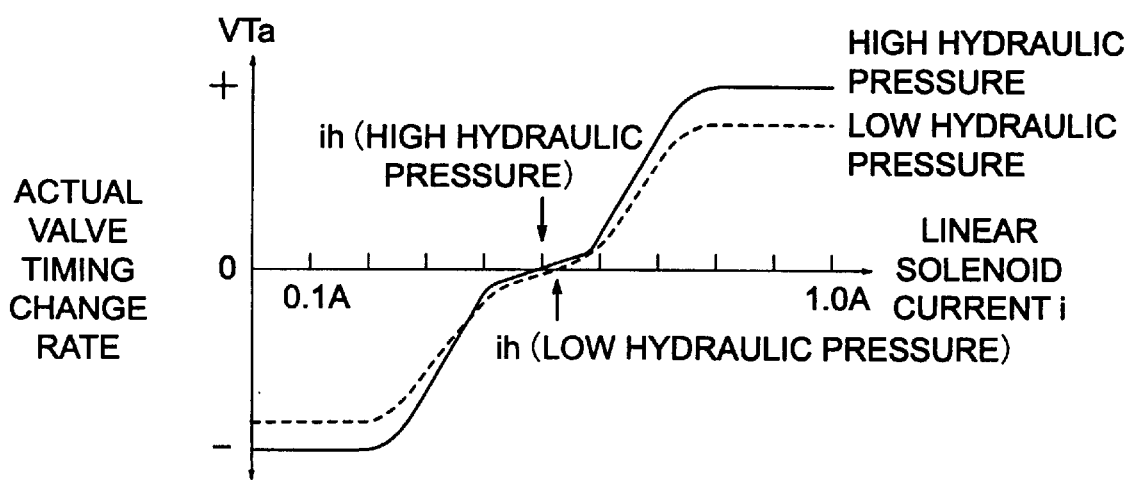
FIG. 21 is a characteristic diagram for illustrating variations of the relation between the control current flowing through the linear solenoid of the conventional oil control valve and the rate of change in the actual valve timing.
Figure 22:
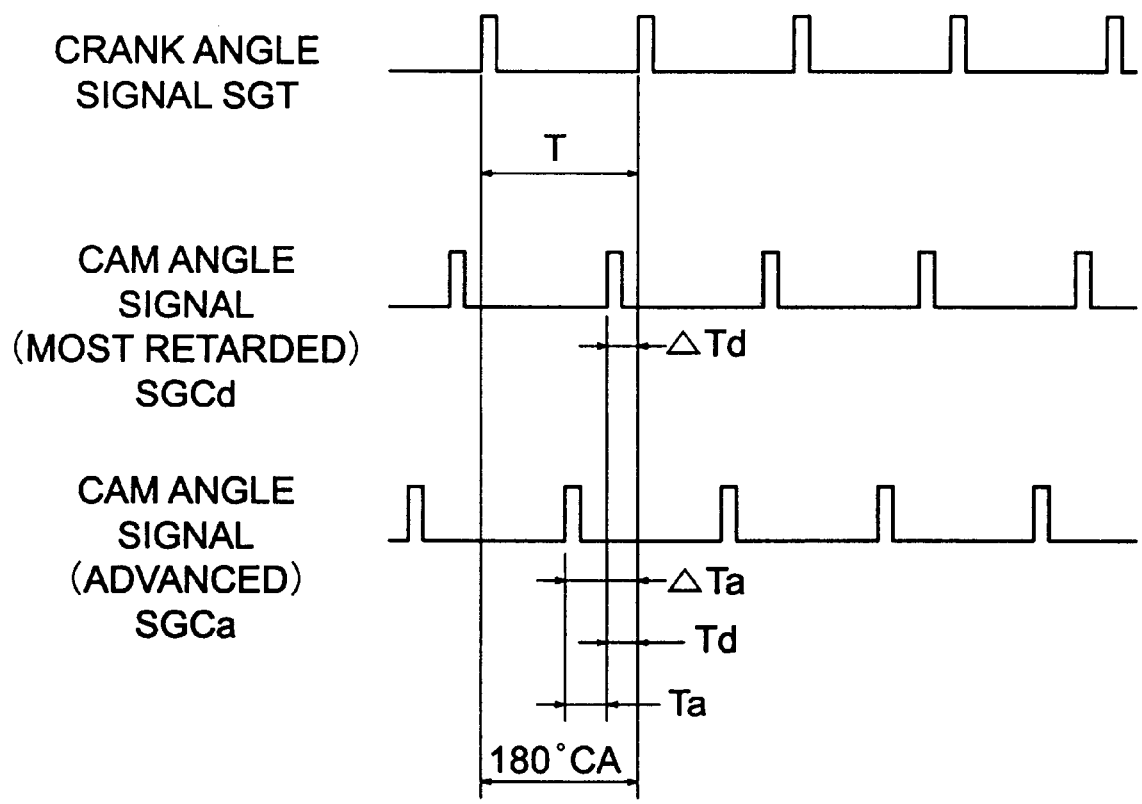
FIG. 22 is a timing chart for illustrating generally time-dependent changes of a crank angle signal, a cam angle signal and a desired valve timing, respectively.

At this juncture, it should be added that the arrangement including the variable valve timing (VVT) system or mechanism to which the teachings of the invention incarnated in the instant embodiment can be applied is substantially same as or similar to that shown in FIG. 10, wherein difference is seen in several parts of the program or programs executed by a microcomputer 101A (FIG. 2) incorporated in the electronic control unit 100A.

Furthermore, the basic operations of the variable valve timing (VVT) system or mechanism as well as peripheral equipment thereof are essentially same as those described hereinbefore by reference to FIGS. 11 to 22. Accordingly, repeated description with regards to these respects will be unnecessary. Additionally, parts or components like as or equivalent to those mentioned hereinbefore (see FIG. 10) are designated by like reference characters and repeated description in detail thereof will be omitted.

Referring to FIG. 10, the electronic control unit (ECU) 100A is comprised of an engine operation state detecting means 201 for detecting the engine operation states D of the internal combustion engine on the basis of output signals of the various sensors (see FIG. 10), a desired valve timing arithmetic means 202 for arithmetically determining a desired valve timing To for at least one of the intake valve 17 and the exhaust valve 18 in dependence on the engine operation state D as detected, and an actual valve timing detecting means 203 for detecting an actual valve timing Ta for at least one of the intake valve 17 and the exhaust valve 18.

In addition, the electronic control unit 100A includes an actual valve timing control means 204 for generating a first control quantity (linear solenoid current i) for the variable valve timing mechanism 40 on the basis of a timing deviation ER between the actual valve timing Ta and the desired valve timing To, an integral control means 205 for arithmetically determining an integral correcting value ΣKi for correcting the first control quantity, i.e., the linear solenoid current i, by integrating the timing deviation ER, and a learning means 206 for deriving a learned value LRN of a second control quantity, i.e., a holding current ih, which is required for holding the actual valve timing Ta on the basis of the integral correcting value ΣKi.

Besides, the electronic control unit 100A includes an initializing condition detecting means 207 for detecting as an initializing condition the engine operation state in which the integral correcting value ΣKi is to be initialized, and an initializing means 208 for initializing the integral correcting value ΣKi to an optimum value which conforms to the engine operation state when the initializing condition is detected.

The actual valve timing control means 204 is designed or programmed to correct the linear solenoid current i on the basis of the learned value LRN.

The integral control means 205 is designed or programmed to decrease the integral correcting value ΣKi by an increment of the learned value LRN while increasing the integral correcting value ΣKi by a decrement of the learned value LRN upon updating of the leaned value LRN.

The learning means 206 is designed or programmed to arithmetically determine the learned value LRN on the basis of an average or mean value (or alternatively a filtered value described later on) of the integral correcting value ΣKi. By way of example, the learning means 206 may be so designed or programmed as to arithmetically determine the learned value LRN on the basis of a mean value of the integral correcting values ΣKi sampled at several time points after inversion of the increasing or decreasing direction of the integral correcting value ΣKi to the decreasing or increasing direction thereof. Additionally, the learning means 206 may also be so designed as to reflect a part of the mean value of the integral correcting values ΣKi to the learned value LRN and set variably the ratio of reflection of the mean value of the integral correcting values ΣKi reflected to the learned value LRN so that the ratio of reflection decreases as the learning process proceeds.

The learning means 206 includes a counter for the learning process (hereinafter also referred to as the learning counter) CLRN for acquiring the learned value LRN in a convergence status in which the desired valve timing To, for example, is substantially constant with the timing deviation ER being smaller than a predetermined value E1.

The variable valve timing mechanism 40 is driven by the oil control valve (OCV) 80 as described hereinbefore in conjunction with the conventional system, whereby at least one of the intake valve 17 and the exhaust valve 18 is controlled variably in respect to the value open/close timing.

On the other hand, the initializing condition detecting means 207 is so designed or programmed as to detect as the initializing condition a timing immediately after the power-supply to the electronic control unit 100A constituting a part of the valve timing control system while the initializing means 208 is so designed or programmed as to set the initial value of the integral correcting value ΣKi to a negative value.

More specifically, the initializing means 208 sets the initial value of the learned value LRN to a median in design (which is equal to 0.5 ampere) when the learned value LRN has not been determined or established yet (i.e., when the learned value LRN is in a not-learned state) while setting the initial value of the integral correcting value ΣKi to the negative value. By contrast, when the learned value LRN has already been determined or is available, the initializing means 208 sets the initial value of the integral correcting value ΣKi to "0" (zero).

Furthermore, the initializing means 208 may be so designed or programmed as to set the initial value of the integral correcting value ΣKi to a value which is equal to or greater than a lower limit value β of a predetermined range and which is equal to or smaller than zero "0" (e.g. the lower limit value β of the predetermined range) when the integral control means 205 includes a limiting means for limiting the integral correcting value ΣKi to a value within the predetermined range mentioned above.

Besides, in the case where the integral control means 205 is comprised of the integral correcting value limiting means, as described just above, the initializing condition detecting means 207 may be so designed or programmed as to detect as an initializing condition the timing or time point at which the integral correcting value ΣKi changes for the first time after it has remained coincident continuously for a predetermined time τ with an upper limit value α or the lower limit value β of the predetermined range (i.e., the timing or time point immediately succeeding to the restoration from an abnormality occurrence state to the normal operation state) in addition to the initializing condition described above (i.e., the timing or time point succeeding immediately to the power-on of the electronic control unit 10A).

Figure 2:
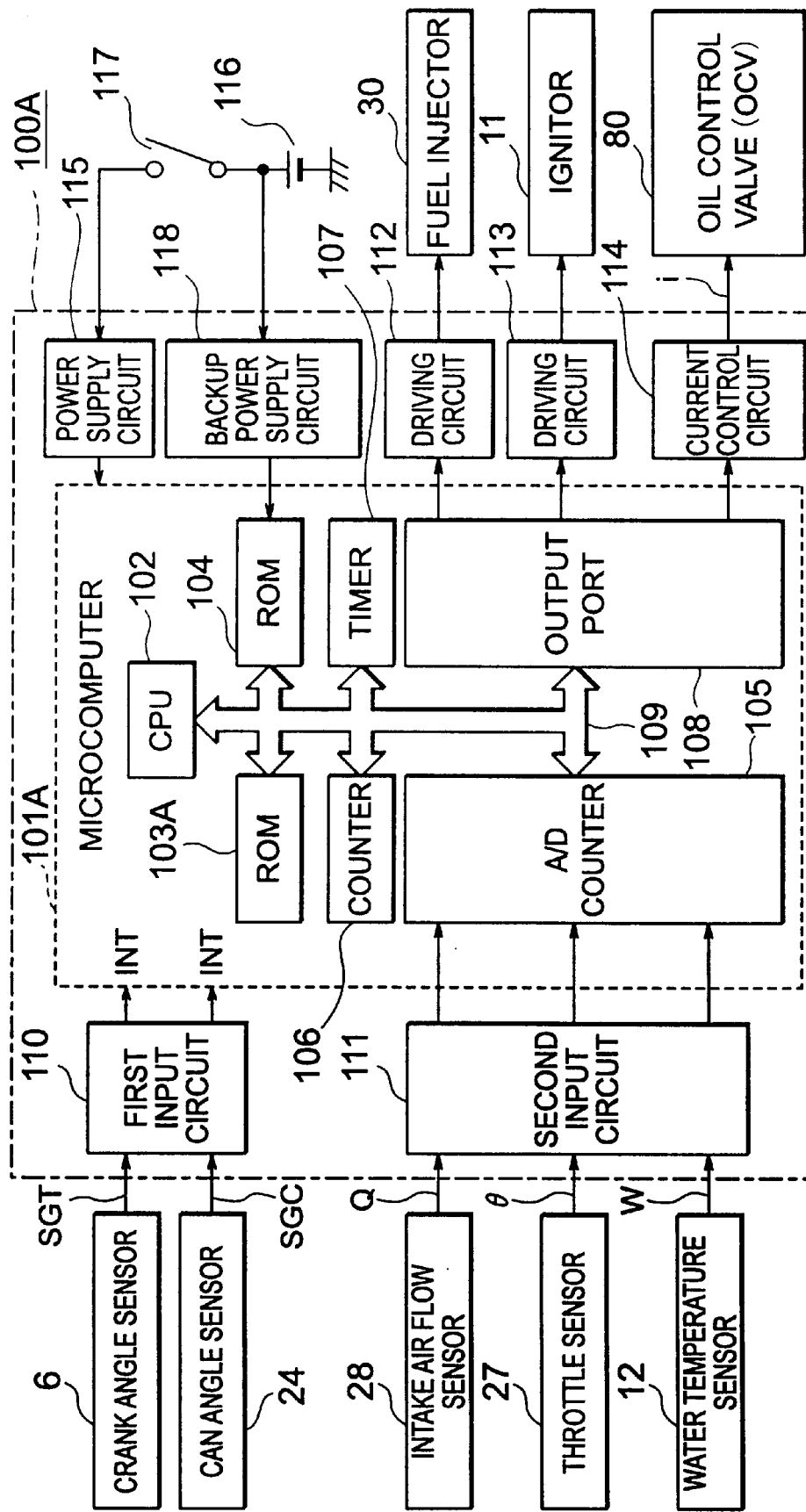
FIG. 2 is a block diagram showing an internal configuration of an electronic control unit (ECU) incorporated in the valve timing control system according to an embodiment of the invention.

FIG. 2 is a block diagram showing an internal configuration of the electronic control unit 100A according to the instant embodiment of the present invention. In this figure, parts or components same as or equivalent to those described hereinbefore by reference to FIG. 23 are denoted by like reference characters and repeated description in detail thereof will be omitted.

Figure 23:
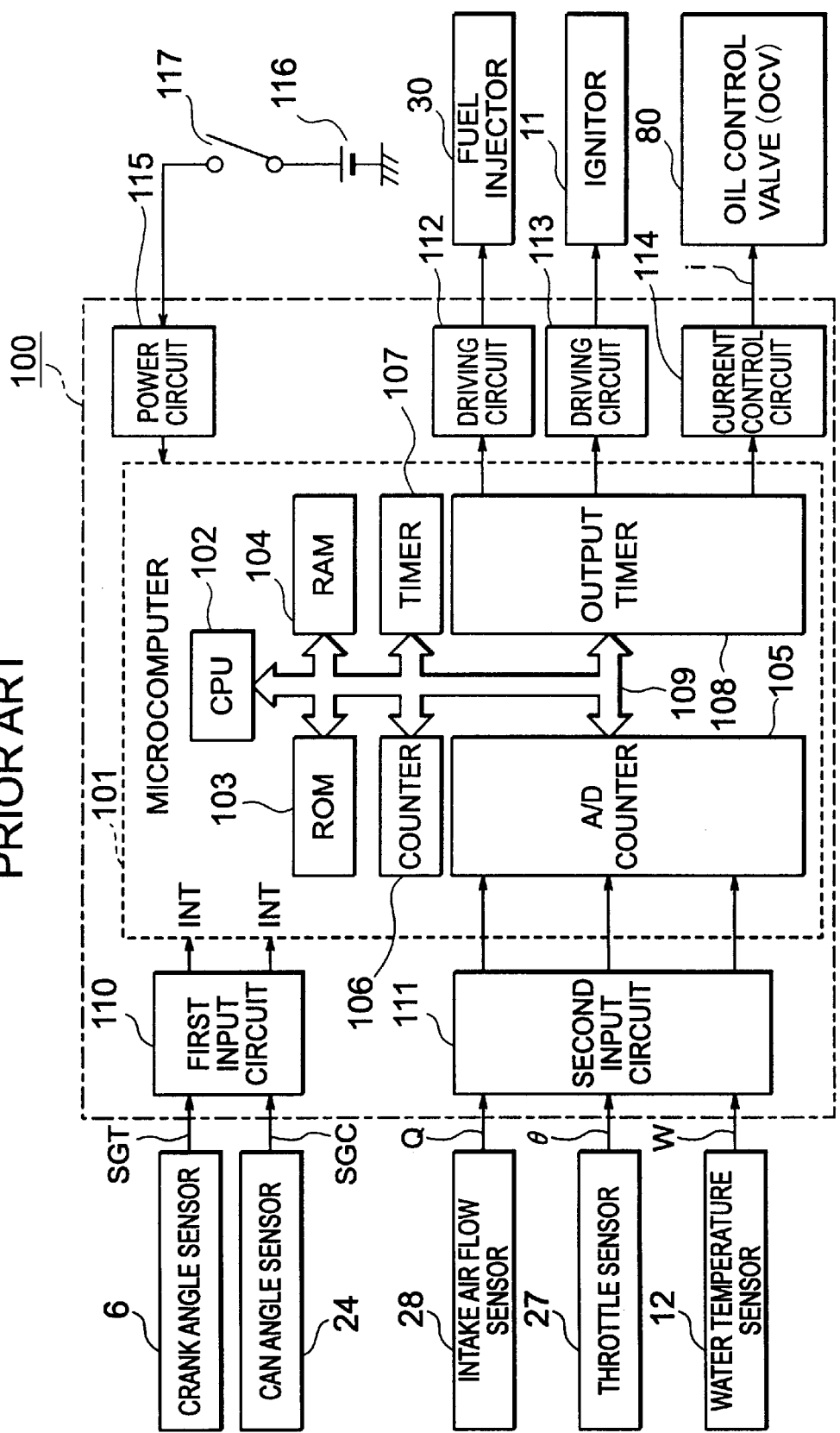
FIG. 23 is a block diagram showing schematically an internal configuration of an electronic control unit employed in a conventional valve timing control system for an internal combustion engine known heretofore.
Figure 24:
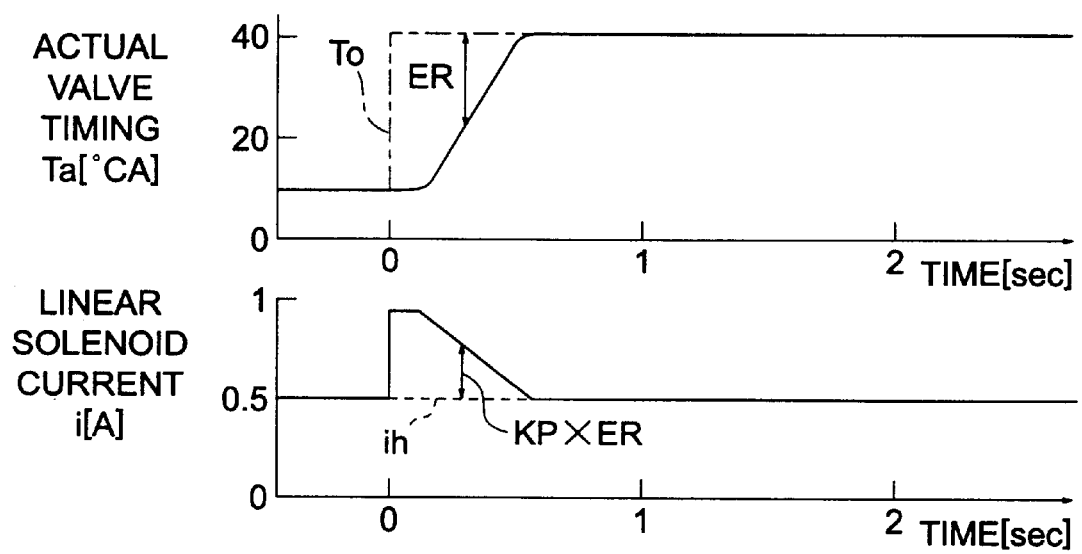
FIG. 24 is a timing chart for illustrating operation of the conventional valve timing control system.
Figure 25:
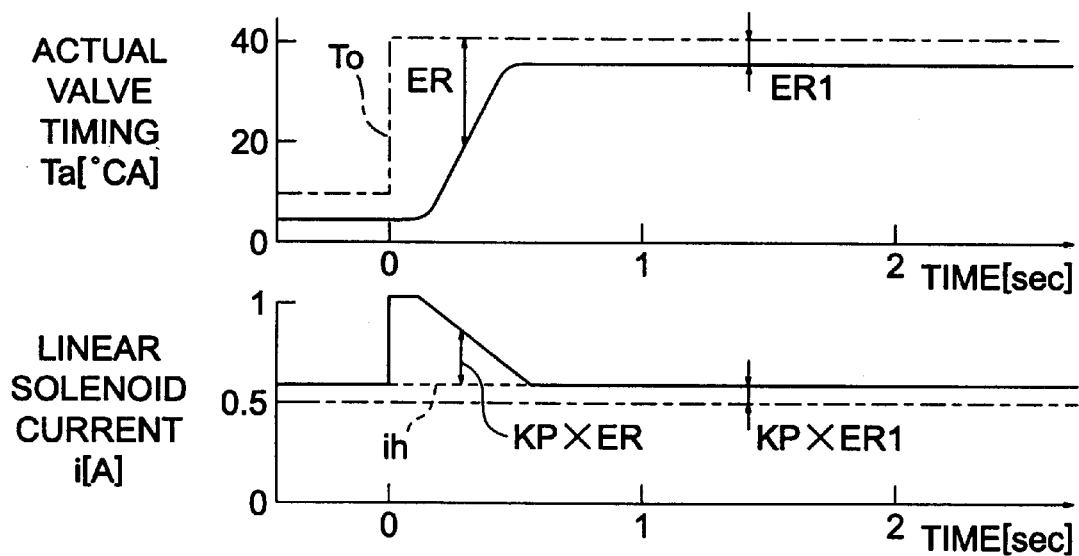
FIG. 25 is a timing chart for illustrating operation of the conventional valve timing control system.
Figure 26:
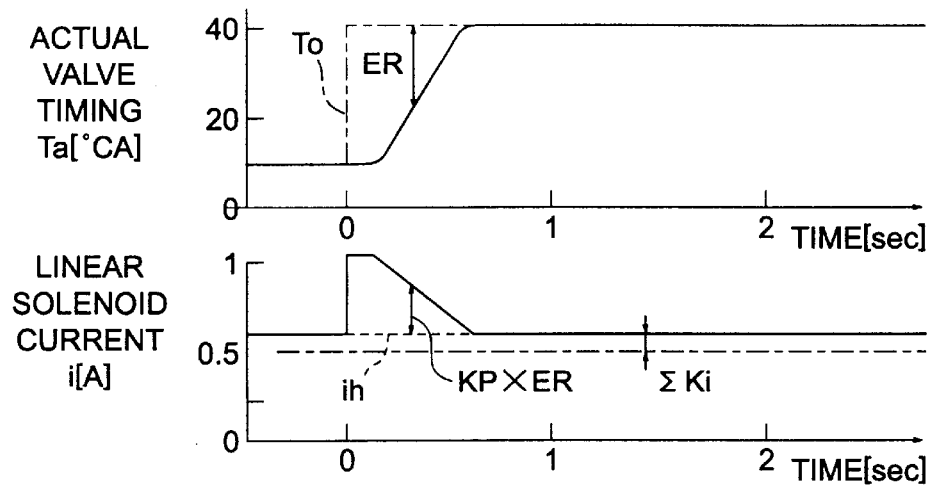
FIG. 26 is a timing chart for illustrating operation of the conventional valve timing control system.

As can be seen from comparison of FIG. 2 with FIG. 23, the electronic control unit 100A differs from the electronic control unit 100 shown in FIG. 23 only in the respect that a backup power circuit 118 is additionally provided. Parenthetically, control program(s) as well as relevant data illustrated in FIG. 4 and described hereinafter are stored in a ROM (read-only memory) 103A incorporated in the microcomputer 101A.

The backup power circuit 118 is connected directly to an output terminal of a battery 116 without interposition of the key switch 117, whereby a constant voltage derived from the battery voltage is supplied to the RAM 104. Thus, the RAM 104 can operate at the constant voltage supplied from the backup power circuit 118, whereby the contents stored in the RAM 104 can be held even when the key switch 117 is in the opened state (off-state).

Figure 3:
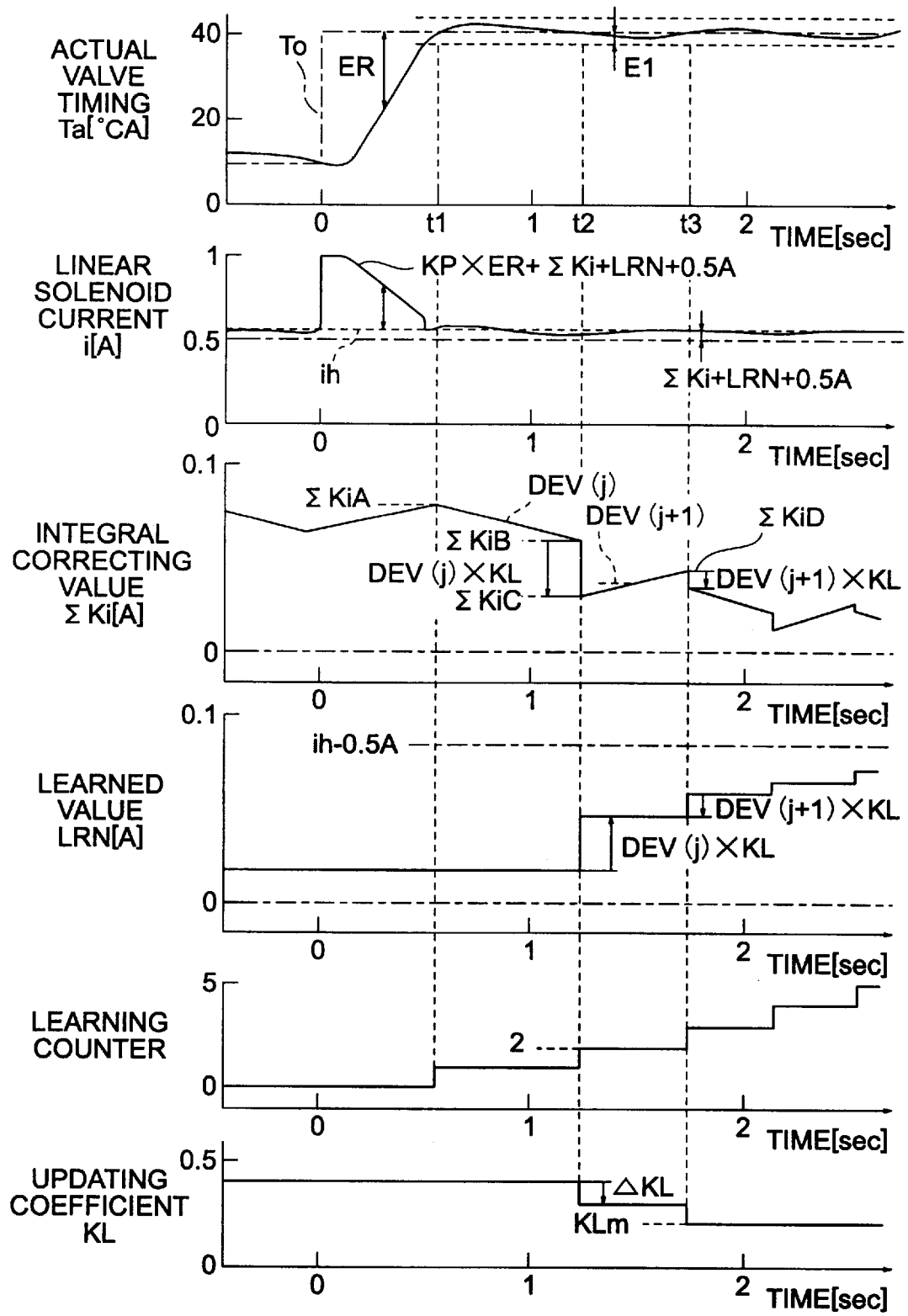
FIG. 3 is a timing chart for illustrating operation of the valve timing control system according to a first embodiment of the invention.

Next, referring to the timing chart shown in FIG. 3, description will be directed to a holding current learning/control operation in the valve timing control system according to the instant embodiment of the invention.

Referring to FIG. 3, when the absolute value of the timing deviation ER of the actual valve timing Ta from the desired valve timing To is equal to or greater than a predetermined value E1 (e.g. 1° in terms of the crank angle or CA in abbreviation), the linear solenoid current i can be arithmetically determined in accordance with the following expression (9):

$$i = KP \times ER + \Sigma Ki + LRN + 0.5 [A] \qquad (9)$$

The above expression (9) corresponds to the expression (6) mentioned previously in conjunction with the conventional system except that the learned value LRN of the holding current for the linear solenoid current i is additionally taken into account. The learning means 206 is designed to acquire the learned value LRN on the basis of the integral correcting value ΣKi for allowing the integral correcting value ΣKi to converge substantially to zero, as will be described hereinafter in more detail. The learned value LRN converges substantially to a value (e.g. ih −0.5 A) which is obtained by subtracting the reference value from the actual holding current ih.

Further, the term ΣKi appearing in the expression (9) can be arithmetically determined in accordance with the following expression (10):

$$\Sigma Ki \leftarrow \Sigma Ki + \Sigma Ki \text{ when } ER \leq 0,$$

and $$\Sigma Ki \leftarrow \Sigma Ki - \Sigma Ki \text{ when } ER < 0 \qquad (10)$$

The above expression (10) corresponds to the expression (7) mentioned hereinbefore, wherein incrementation/decrementation value ΣKi for the integral correcting value ΣKi is set to a constant value (e.g. 0.1 mA) regardless of the magnitude of the timing deviation ER.

On the other hand, when the absolute value of the timing deviation ER is smaller than a predetermined value E1, the linear solenoid current i can be arithmetically determined in accordance with the following expression (11):

$$i = \Sigma Ki + LRN + 0.5 [A] \quad (11)$$

The above expression (11) corresponds to the expression (9) mentioned hereinbefore except that the proportional control value (KP×ER) is deleted from the expression (9).

In more concrete, in the state in which the actual valve timing Ta has converged substantially to the desired valve timing To (i.e., the state in which |ER|<E1), the actual valve timing Ta is controlled stably with reference to the desired valve timing To. To this end, the proportional control (KP× ER) based on the timing deviation ER is invalidated to thereby cause the actual valve timing Ta to change only through the integral control action (ΣKi).

Through the control procedure described above, the actual valve timing Ta is so changed as to converge to the desired valve timing To in dependence on the change of the desired valve timing To.

However, in the convergence status in which the desired valve timing To is essentially constant and the absolute value of the timing deviation ER is smaller than the predetermined value E1, the linear solenoid current i determined in accordance with the expression (11) mentioned previously can be regarded as indicating essentially the actual holding current ih. Accordingly, the learning means 206 executes the learning procedure for acquiring the learned value LRN on the basis of the integral correcting value ΣKi, as described below.

At first, the learning means 206 increments the learning counter CLRN by "1" (one) at a time point t1 at which the sign of the timing deviation ER is inverted in succession to the state where the actual valve timing Ta has substantially converged to the desired valve timing To.

In that case, when the value of the learning counter CLRN is "1", the integral correcting value ΣKiA at the time point t1 is stored as a peak value Pi of the integral correcting value ΣKi.

The value of the learning counter CLRN is reset to zero unless the desired valve timing To is constant or unless the absolute value of the timing deviation ER is smaller than the predetermined value E1. Thus, the value of the learning counter CLRN indicates the number of times the sign FER of the timing deviation ER has undergone inversion after the convergence status has been attained.

When the above-mentioned convergence status continues to prevail and when the sign FER of the timing deviation ER is inverted again at a time point t2 in succession to the time point ti, the learning means 206 increments additionally the learning counter CLRN by "1" (one).

In that case, when the value of the learning counter CLRN is equal to or greater than "2", a mean value (ΣKiA+ΣKiB)/2 of the integral correcting value ΣKiB at the time point t2 and the preceding peak value Pi of the integral correcting value ΣKi (=ΣKiA) is stored as an integral correcting value deviation (i.e., deviation of the integral correcting value) DEV.

Besides, in order to reflect a part of the integral correcting value deviation DEV in the learned value LRN, the integral correcting value deviation DEV is multiplied by an updating coefficient KL (≦1) to thereby arithmetically determine the product (DEV×KL) which is then added to the learned value LRN.

To say in another way, when the sign FER of the timing deviation ER has been inverted twice or more in the state in which the convergence status continues to exist, the learned value LRN is updated upon every inversion of the sign FER of the timing deviation ER. Consequently, the peak value Pi of the integral correcting value ΣKi stored at the time point t2 assumes a value ΣKiC shown in FIG. 3.

Similarly, when the sign FER of the timing deviation ER is inverted once again at a time point t3, the learning means 206 increments additionally the count of the learning counter CLRN by "1" (one), whereon a mean value "(ΣKiC+ΣKiD)/2" between the integral correcting value ΣKiD at the time point t3 and the preceding peak value Pi (=ΣKiC) of the integral correcting value is stored as the integral correcting value deviation DEV.

Besides, in order to reflect a part of the integral correcting value deviation DEV in the learned value LRN, the integral correcting value deviation DEV is multiplied by the updating coefficient KL, whereon the product resulting from the multiplication is added to the learned value LRN.

The updating coefficient KL is decremented by a predetermined value ΔKL (e.g. 0.1) every time the learned value LRN is updated until a lower limit value KLm (e.g. 0.2) of the updating coefficient KL has been attained. At this juncture, it should be noted that the updating coefficient KL is initialized to a predetermined value KLo (e.g. 1.0) upon every power-on of the electronic control unit 100A with the key switch 117 being closed.

Although the ratio at which the integral correcting value deviation DEV is reflected in the learned value LRN is high at a time point immediately following the closing or turn-on of the key switch 117, the above-mentioned ratio decreases gradually as the learning process progresses.

Thus, the learned value LRN can speedily be made to converge closely to the actual holding current ih immediately after closing of the key switch 117, i.e., at the time point at which the probability of the learned value LRN being different from the actual holding current ih is high.

Further, in the state in which the learned value LRN becomes close to the holding current ih as the learning process proceeds, it is possible to suppress variation of the learned value LRN even if the integral correcting value ΣKi should vary abnormally.

Furthermore, since the product resulting from the multiplication of the integral correcting value deviation DEV by the updating coefficient KL is subtracted from the integral correcting value ΣKi upon updating of the learned value LRN, a sum of the integral correcting value ΣKi and the learned value LRN can remain unchanged before and after the updating of the learned value LRN.

In that case, the integral correcting value ΣKi undergone the subtraction, e.g. the integral correcting value ΣKiC shown in FIG. 3, is stored as the peak value Pi of the integral correcting value at the time point t2 so as to be made use of for the arithmetic determination of the integral correcting value deviation DEV upon succeeding inversion of the sign of the timing deviation ER at a time point t3.

By repeating the operations described above, the learned value LRN can converge to a value (ih −0.5 ampere) obtained by subtracting the reference value from the actual holding current ih while the integral correcting value ΣKi can converge to zero.

Further, because the learned value LRN is stored and held in the RAM 104 which is continuously supplied with electric power from the backup power circuit 118 during the time period for which the key switch 117 is opened, the actual valve timing Ta can be made to converge speedily to the desired valve timing To even at a time point immediately after the closing of the key switch 117.

Parenthetically, the learned value LRN is initialized to zero immediately after the battery 116 is connected.

Figure 4:
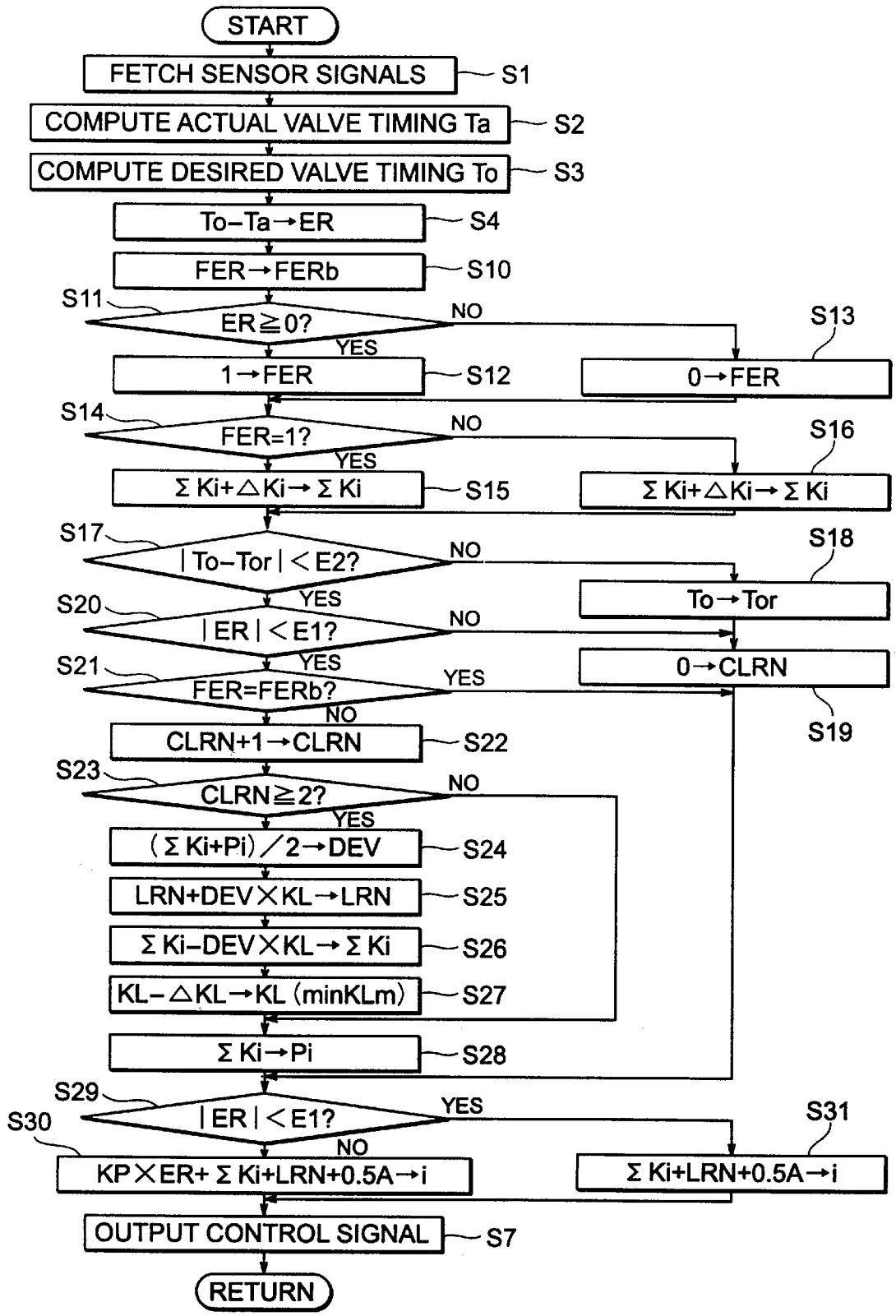
FIG. 4 is a flow chart for illustrating a learning procedure executed by the electronic control unit incorporated in the valve timing control system according to the first embodiment of the present invention.
Figure 5:
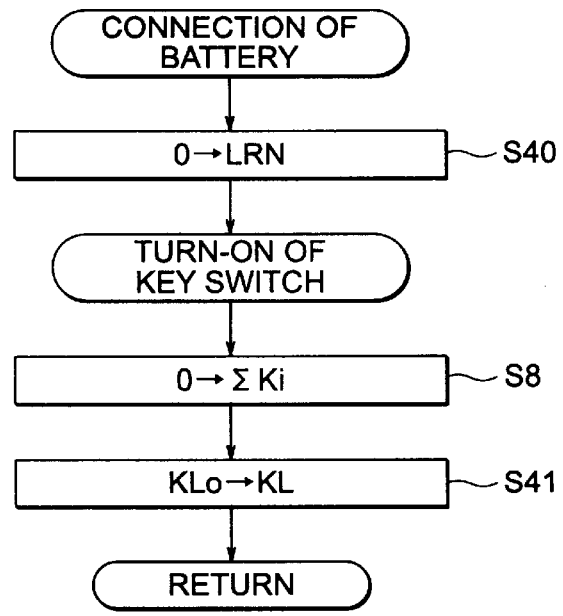
FIG. 5 is a flow chart for illustrating initializing operation performed immediately after power-on by the electronic control unit of the valve timing control system according to the first embodiment of the invention.

Next, referring to flow charts shown in FIGS. 4 and 5, the operations mentioned above will be elucidated in more concrete.

FIG. 4 illustrates in a flow chart a program executed by the CPU 102 incorporated in the microcomputer 101A (see FIG. 2) periodically at a time interval of 25 msec. (i.e., upon every lapse of 25 msec.).

Figure 27:
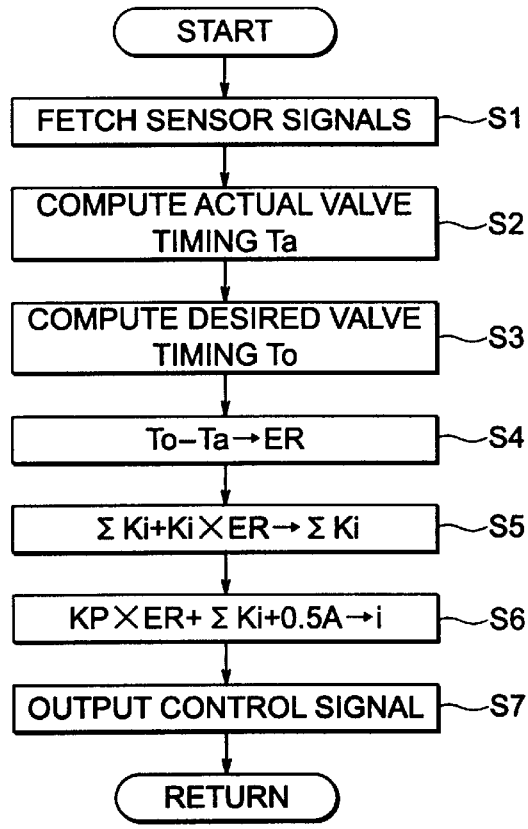
FIG. 27 is a flow chart for illustrating operation of the conventional valve timing control system for the internal combustion engine known heretofore.

As can be seen in FIG. 4, the steps S5 and S6 described hereinbefore by reference to FIG. 27 are substituted for by steps S10 to S31. Parenthetically, the processing steps same as or equivalent to those described hereinbefore are designated by like reference characters and repeated description in detail thereof is omitted.

Figure 28:
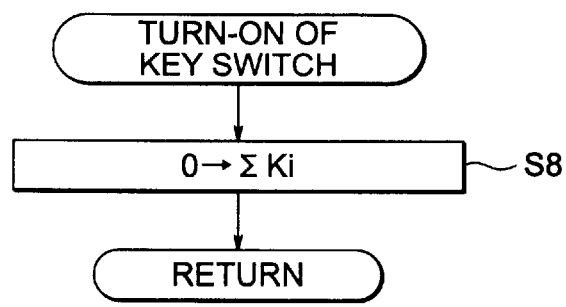
FIG. 28 is a flow chart for illustrating operation of the conventional valve timing control system.
Figure 29:
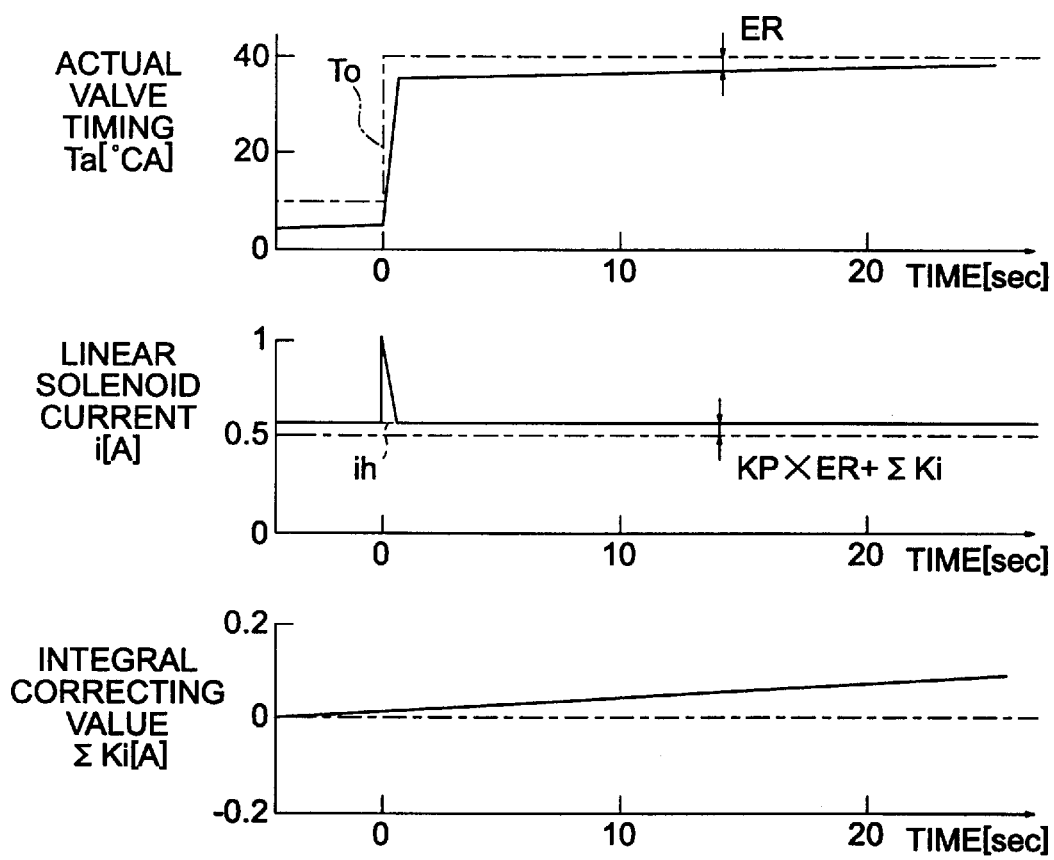
FIG. 29 is a timing chart for illustrating operation performed by the conventional valve timing control system immediately upon closing of a key switch.
Figure 30:
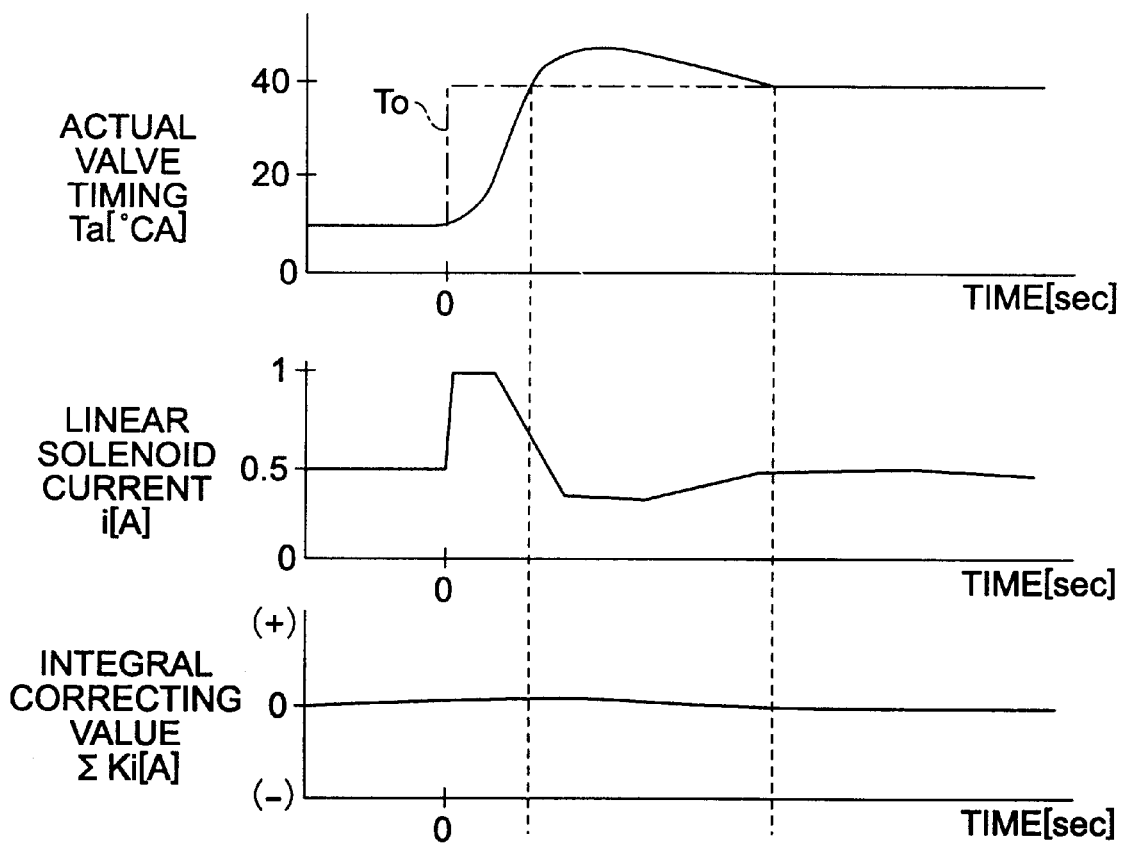
FIG. 30 is a timing chart for illustrating operation performed by the conventional valve timing control system immediately after closing of the key switch.
Figure 31:
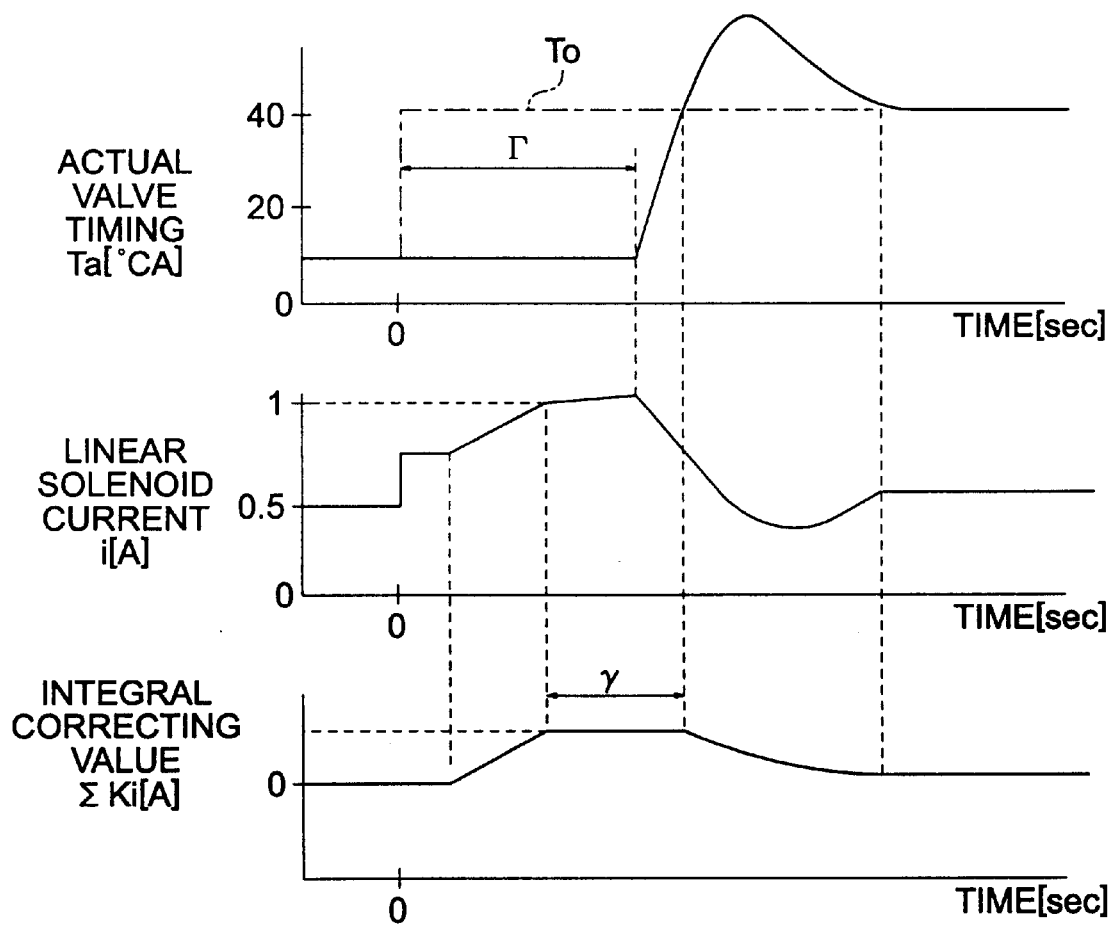
FIG. 31 is a timing chart for illustrating operation performed by the conventional valve timing control system immediately upon restoration from an abnormality occurrence state to a normal operation state.

The routine illustrated in FIG. 5 differs from that described hereinbefore by reference to FIG. 28 in that the steps S40 and S41 are additionally provided.

Referring to FIG. 4, in a step S1, the microcomputer 101A fetches the operation state signals such as the crank angle signal period T, the engine rotation number NE, the phase difference time $\Delta T$, the intake air flow Q, the throttle opening degree e and the cooling water temperature W. Parenthetically, the step S1 corresponds to the engine operation state detecting means 201 shown in FIG. 1.

Further, in steps S2 and S3, the actual valve timing Ta and the desired valve timing To are arithmetically determined, respectively, and then the timing deviation ER is computed in accordance with the expression (4) mentioned hereinbefore in a step S4. Incidentally, the steps S2 and S3 correspond to the actual valve timing detecting means 203 and the desired valve timing arithmetic means 202, respectively, which are shown in FIG. 1.

In succession, after completion of the processing step S4, the deviation sign (i.e., sign of the timing deviation) FER is placed for the preceding deviation sign FERb in a step S10, which is then followed by a decision step S11 where decision is made as to whether the timing deviation ER is equal to or greater than zero.

When the decision step S11 results in $E \geq 0$ (i.e., affirmation or "YES"), the deviation sign FER is set to "1" (one) in a step S12, whereas when ER<0 (i.e., when the decision step S11 results in negation or "NO"), the deviation sign FER is reset to "0" (zero) in a step S13.

Through the processings in the steps S10 to S13, the sign of the current timing deviation ER is stored as the deviation sign FER, while the sign of the timing deviation ER at the time point preceding by 25 msec. is stored as the preceding deviation sign FERb.

In succession, after execution of the processing steps S12 and S13, decision is made whether or not the deviation sign FER is "1" in a step S14. When this decision shows that FER=1 (i.e., when the answer of the decision step S14 is "YES"), this means that the actual valve timing Ta is retarding relative to the desired valve timing To. Accordingly, the incrementation/decrementation value $\Delta Ki$ is added to the integral correcting value $\Sigma Ki$ in a step S15, whereupon the processing proceeds to a succeeding decision step S17.

On the other hand, when it is decided in the step S14 that FER=0 (i.e., when the answer of the decision step S14 is "NO"), this means that the actual valve timing Ta is advancing relative to the desired valve timing To. Accordingly, the incrementation/decrementation value $\Delta Ki$ is subtracted from the integral correcting value $\Sigma Ki$ in a step S16, whereon the processing proceeds to a next decision step S17.

Incidentally, the steps S15 and S16 mentioned above correspond to the integral control means 205 shown in FIG. 2.

The integral correcting value $\Sigma Ki$ is initialized to "0" in the step S8 shown in FIG. 5 immediately upon closing of the key switch 117 for supplying electric power to the electronic control unit 100A.

Next, a desired valve timing status decision reference value Tor is set as a reference value for making decision as to whether or not the desired valve timing To is in a constant status, and then it is decided whether or not an absolute value of the difference between the desired valve timing To and the desired valve timing status decision reference value Tor is smaller than a predetermined value E2 (e.g. 0.5° CA) in a step S17.

When it is decided in the step S17 that $|To-Tor| \geq E2$ (i.e., when the decision step S17 results in "NO"), this means that the desired valve timing To is not constant. Accordingly, the current desired valve timing To is stored as the updated desired valve timing status decision reference value Tor in a step S18, whereon the learning counter (i.e., counter for the learning process) CLRN is reset to zero in a step S19. The processing can now proceed to a decision step S29 described hereinafter.

On the other hand, when it is decided in the step S17 that $|To-Tor|<E2$ (i.e., when the decision step S17 results in "YES"), this means that the desired valve timing To is substantially constant. In that case, decision is then made as to whether or not the absolute value of the timing deviation ER is smaller than the predetermined value E1 in a step S20.

When decision is made in the step S20 that $|ER1>E1$ (i.e., when the decision step S20 results in negation or "NO"), the processing then proceeds to the step S19 where the learning counter CLRN is reset to zero. On the other hand, when the decision in the step S20 shows that $|ER1|<E1$ (i.e., when the result of the decision step S20 is "YES"), this means that the condition enabling the learning of the holding current ih is satisfied. Accordingly, decision is made in a step S21 as to whether or not the deviation sign FER coincides with the preceding deviation sign FERb.

When it is decided in the step S21 that FER=FERb (i.e., when the decision step S21 results in "YES"), the processing proceeds to a decision step S29 described hereinafter.

On the other hand, when it is found that FER≠FERb (i.e., when the decision step S21 results in negation "NO"), this means that the sign FER of the timing deviation ER is inverted. Thus, the learning counter CLRN is incremented by "1" in a step S22, whereon decision is made as to whether or not the value of the learning counter CLRN is equal to or greater than "2" (step S23).

When it is decided in the step S23 that CLRN<2 (i.e., when the decision step S23 results in "NO"), the processing proceeds to a decision step S28 described hereinafter because the value of the learning counter CLRN is By contrast, when it is decided that CLRN≠2 (i.e., when the decision step S23 results in "YES"), the mean value $(\Sigma Ki+Pi)/2$ between the integral correcting value $\Sigma Ki$ and the peak value Pi of the integral correcting value is arithmetically determined to be subsequently stored as the deviation DEV of the integral correcting value (hereinafter also referred to as the integral correcting value deviation DEV) in a step S24.

Further, a product (DEV×KL) resulting from multiplication of the integral correcting value deviation DEV by the updating coefficient KL is added to the learned value LRN for thereby updating the learned value LRN (step S25).

Parenthetically, the learned value LRN is initialized to "0" immediately after the battery 116 is connected to the electronic control unit 100A (step S40 in FIG. 5).

Subsequently, after execution of the step S25, the value (DEV×KL) obtained by multiplying the integral correcting value deviation DEV by the updating coefficient KL is subtracted from the integral correcting value ΣKi for thereby updating the integral correcting value ΣKi (step S26).

Similarly, the predetermined value ΔKL is subtracted from the updating coefficient KL for thereby updating the updating coefficient KL (step S27). In that case, the updating coefficient KL is limited to the lower limit value KLm.

Incidentally, the updating coefficient KL is initialized to a predetermined value KLo in the step S41 shown in FIG. 5 immediately succeeding to application of the electric power to the electronic control unit 100A upon closing of the key switch 117.

Subsequently, after execution of the step S27 or when decision is made that CLRN<2 in the step S23 (i.e., when the step S23 results in "NO"), the current integral correcting value ΣKi is stored as the peak value Pi of the integral correcting value in the step S28.

Parenthetically, the steps S17 to S28 mentioned above functionally correspond to the learning means 206 shown in FIG. 1.

Additionally, after execution of the step S19 or S28 or when it is decided that FER=FERb in the step S21 (i.e., when the step S21 results in "YES"), decision is made again as to whether or not the absolute value of the timing deviation ER is smaller than the predetermined value E1 in a step S29.

When it is found in the decision step S29 that |ER|≧E1 (i.e., when the answer of the decision step S29 is "NO"), the actual valve timing control means 204 arithmetically determines the linear solenoid current i of the oil control valve (OCV) 80 in accordance with the expression (9) mentioned hereinbefore (step S30).

More specifically, the actual valve timing control means 204 adds together the control quantity (KP×ER+0.5 ampere) arithmetically determined in accordance with the expression (3) mentioned hereinbefore, the integral correcting value ΣKi generated by the integral control means 205 and the learned value LRN generated by the learning means 206 to thereby output the sum quantity as a final or ultimate control quantity (i.e., ultimate linear solenoid current i).

On the other hand, when the decision step S29 results in that |ER|<E1 (i.e., when this step S29 results in "YES"), the actual valve timing control means 204 arithmetically determines the linear solenoid current i of the oil control valve (OCV) 80 in accordance with the expression (11) mentioned hereinbefore (step S31).

In more concrete, the actual valve timing control means 204 adds together the holding current ih (=ΣKi+0.5 A) computed in accordance with the expression (8) mentioned hereinbefore and the learned value LRN to thereby output the sum obtained from the addition mentioned just above as the ultimate control quantity (i.e., the linear solenoid current i).

Finally, a duty signal representative of the linear solenoid current i for the oil control valve 80 is outputted through the output port 108 in the step S7 mentioned hereinbefore, whereupon the processing routine illustrated in FIG. 4 comes to an end.

Parenthetically, the steps S29 to S31 and the step S7 mentioned above functionally correspond to the actual valve timing control means 204 shown in FIG. 1.

As will now be understood from the foregoing description, by providing the learning means 206 for acquiring the learned value LRN of the control quantity (linear solenoid current i) corresponding to the holding current ih for the oil control valve 80 to thereby correct the control quantity immediately after the closing of the key switch 117, it is possible to make the actual valve timing Ta converge speedily to the desired valve timing To.

Furthermore, because the integral control means 205 is so arranged as to decrease or increase the integral correcting value ΣKi for thereby correcting the incrementation/decrementation quantity of the learned value LRN upon updating of the learned value LRN, the control quantity is prevented from varying before and after the updating of the learned value LRN, whereby the control can be performed with enhanced stability.

Additionally, by virtue of such arrangement of the integral control means 205 that the integral correcting value ΣKi is initialized on the basis of the learned value LRN, the actual valve timing Ta can be converged speedily to the desired valve timing To even at a time point immediately after the closing of the key switch 117.

Besides, by virtue of such arrangement of the learning means 206 that the learned value LRN is arithmetically determined on the basis of the mean value of the preceding integral correcting values ΣKi for acquiring by learning the median of the holding currents ih, it is possible to suppress positively variation of the learned value LRN even when the integral correcting value ΣKi should vary abnormally.

Moreover, owing to such arrangement of the learning means 206 that the learned value LRN is arithmetically determined on the basis of the mean value of plural preceding integral correcting values ΣKi each obtained at the time point when the increasing/decreasing direction of the integral correcting value ΣKi (deviation sign FER) was inverted, it is possible to determine with high accuracy the mean value of the integral correcting value ΣKi within a short time. Further, when the integral correcting values ΣKi varies only in one direction due to some abnormality, erroneous learning can be excluded although determination of the learned value LRN is impossible.

Furthermore, since the learning means 206 is so i designed as to reflect a part of the mean value of the integral correcting values ΣKi in the learned value LRN, the learned value LRN can be protected against variation even when the mean value of the integral correcting values ΣKi should change abnormally.

Moreover, owing to such arrangement that the learning means 206 decreases the ratio of reflection of the mean value of the integral correcting values ΣKi in the learned value LRN as the learning process proceeds, the learned value LRN can be made to be close to the actual holding current ih speedily immediately after closing of the key switch 117 at which the probability of the learned value LRN deviating from the actual holding current ih is high. When the learned value LRN becomes at least approximately equal to the actual holding current ih as the learning process proceeds, the learned value LRN can then be protected against variation even when the mean value of the integral correcting values ΣKi should change abnormally.

In addition, because the learning means 206 is designed so as to acquire the learned value LRN in the valve timing converging status, the learning process can be performed in the state where the control quantity (linear solenoid current i) is close to the actual holding current ih. Thus, the erroneous learning of the holding current ih can be excluded.

Next, referring to FIGS. 6 to 9, description will be made more concretely of the initialization operation performed by the valve timing control system according to the first embodiment of the invention.

First, referring to a timing chart of FIG. 6, initializing operation carried out immediately after the power-on (i.e., closing of the key switch) will be described.

When electric power supply is started, for example, upon closing of the key switch 117, then an initializing condition detecting signal is immediately issued by the initializing condition detecting means 207. In response to the initializing condition detecting signal, the initializing means 208 executes an initialization processing, whereby the initial value of the learned value LRN is set to a median in design (=0.5 ampere) while the initial value of the integral correcting value $\Sigma Ki$ is set to a negative value.

Figure 6:
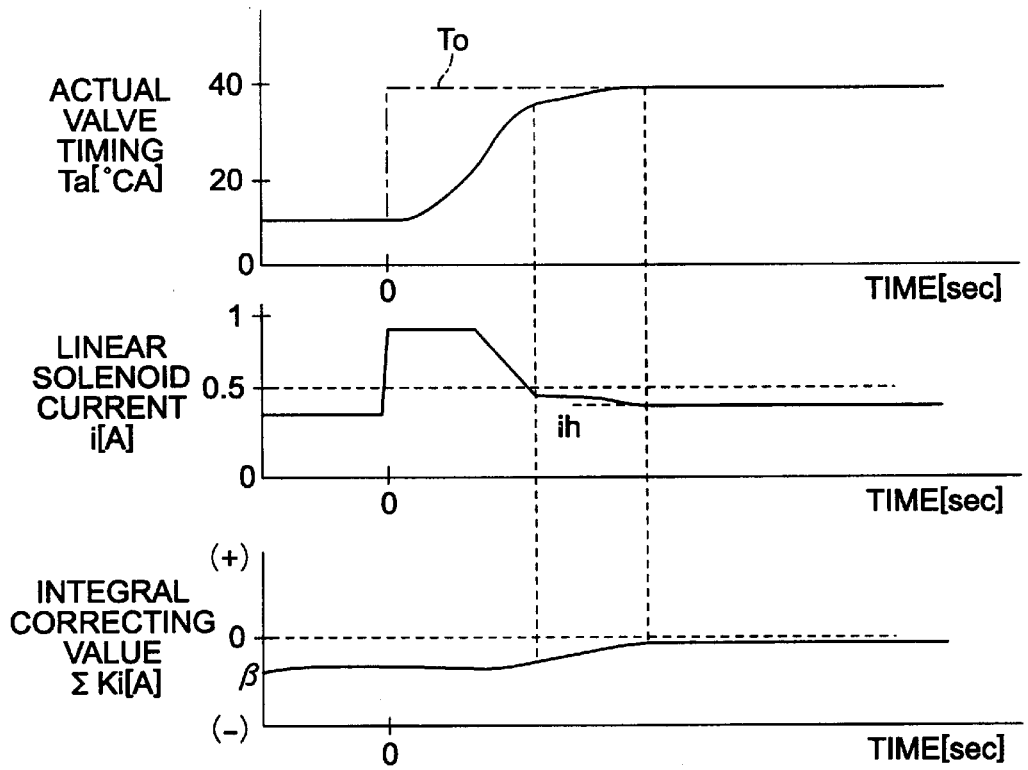
FIG. 6 is a timing chart for illustrating initializing operation performed immediately after power-on of the valve timing control system according to the first embodiment of the invention.

In that case, even when the initial value of the learned value LRN is set to the median in design, the linear solenoid current i will rise up from a current value smaller than the median in design (0.5 ampere) as shown in FIG. 6 because the initial value of the integral correcting value $\Sigma Ki$ is negative.

Thus, during a time period in which the actual valve timing Ta is rising toward the desired valve timing To, the linear solenoid current i is suppressed. On the other hand, the integral correcting value $\Sigma Ki$ starts to increase gradually from the negative value towards zero.

As the integral correcting value $\Sigma Ki$ increases, the actual valve timing Ta gradually approaches to the desired valve timing To while the linear solenoid current i gradually lowers to converge to the holding current ih.

Accordingly, even when the linear solenoid current i for holding the phase of the variable valve timing mechanism 40 (i.e., the holding current ih) is lower than the median in design (0.5 ampere), occurrence of overshoot of the actual valve timing Ta upon initialization is prevented, whereby extension of the valve overlap can be suppressed.

As can be appreciated from the above, according to the teachings of the present invention, the actual valve timing Ta can be converged speedily to the desired valve timing To immediately after the power-on of the electronic control unit 100A while ensuring protection of engine operation performance and the exhaust gas quality against degradation without fail.

Next, referring to a timing chart shown in FIG. 9 together with flow charts illustrated in FIGS. 7 and 8, description will be made more concretely of the initializing condition detecting operation which is validated immediately after restoration of the normal operation state from the abnormality occurrence state in the valve timing control system according to the first embodiment of the invention.

Figure 7:
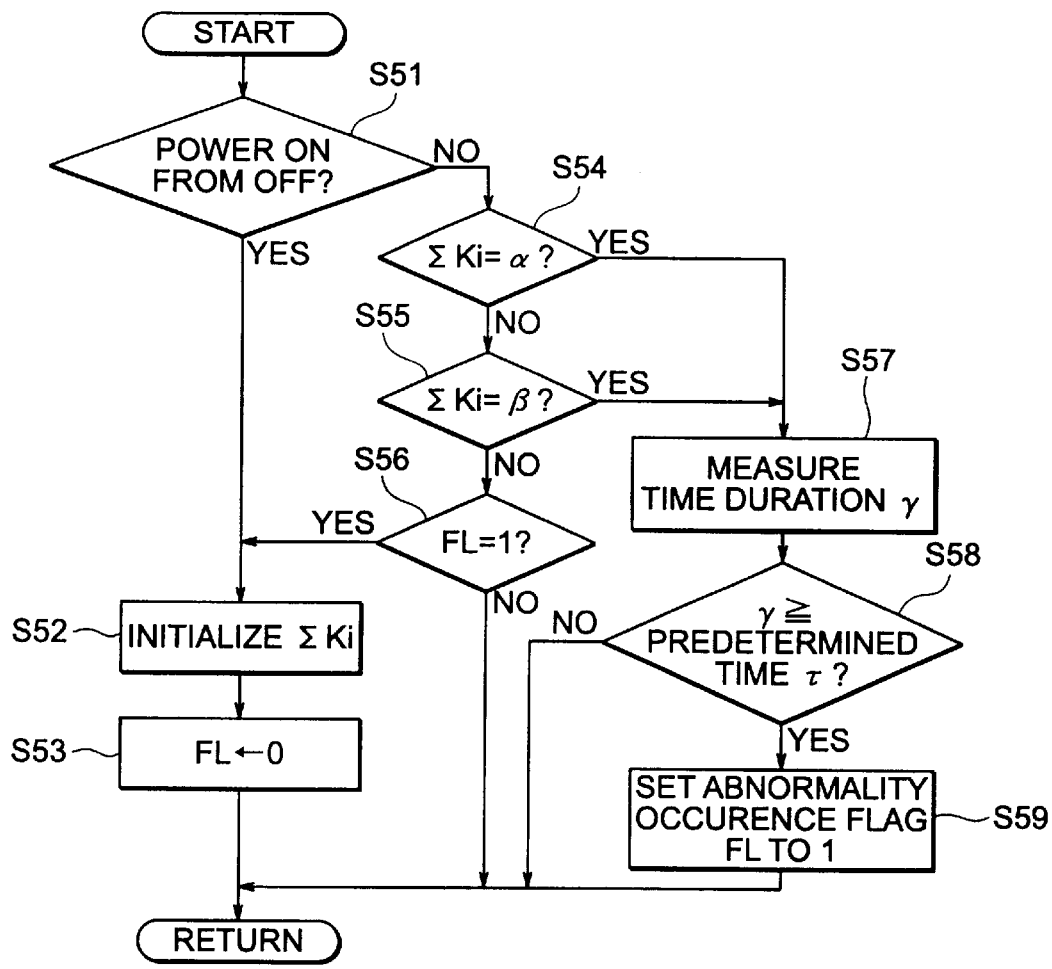
FIG. 7 is a flow chart for illustrating another initializing operation performed by the valve timing control system according to the first embodiment of the invention.

Referring to FIG. 7, it is first decided by the initializing condition detecting means 207 whether or not the power-supply to the electronic control unit 100A is turned from the off-state to the on-state, to thereby determine power-on state of the electronic control unit immediately after closing of the key switch (step S51).

When the power-on state is decided in the step 51 (i.e., when the decision step S51 results in affirmation "YES"), an initialization processing of the integral correcting value $\Sigma Ki$ is carried out in a step S52 to clear an abnormality occurrence flag FL (which will be described later on) to "0" (zero) in a step S53, whereon the processing routine illustrated in FIG. 7 comes to an end.

On the other hand, when decision is made in the step 51 that the current time point is not just after the power-on (i.e., when the decision step S51 results in negation "NO"), the processing for detecting the initializing condition (step S54 to S59) is executed by deciding whether or not the current time point is just after restoration to the normal operation state from the abnormality occurrence state.

At first, decision is made whether or not the integral correcting value $\Sigma Ki$ is equal to the upper limit value $\alpha$ (step S54). When it is decided in the step S54 $\Sigma Ki \neq \alpha$ (i.e., when the decision step S54 results in negation "NO"), it is then decided whether or not the integral correcting value $\Sigma Ki$ is equal to the lower limit value $\beta$ (step S55).

When it is decided in the step S55 that $\Sigma Ki \neq \beta$ (i.e., when the decision step S55 results in negation "NO"), then decision is made in a step S56 whether or not the abnormality occurrence flag FL is set to "1" (i.e. whether or not the abnormality occurrence state has prevailed up to the preceding cycle).

When it is decided in the step S56 that the abnormality occurrence flag FL is equal to "1" (FL=1) (i.e., when the decision step S56 results in "YES"), this means that the current time point is just after the restoration to the normal operation state from the abnormality occurrence state. Thus, the initializing condition is satisfied. Accordingly, the processing proceeds to initialization of the integral correcting value $\Sigma Ki$ (step S52). If otherwise (i.e., when FL=0 with the decision step S56 resulting in "NO"), this means that the normal operation state is prevailing. Thus, the processing routine illustrated in FIG. 7 is terminated intactly.

On the other hand, when the integral correcting value $\Sigma Ki$ is in the fixed state and when the condition that $\Sigma Ki = \alpha$ or $\Sigma Ki = \beta$ is decided to be valid in the step S54 or S55 (i.e., when the decision step S54 or S55 results in "YES"), the time duration $\gamma$ of the fixed state is measured in a step S57. In succession, it is decided in a step S58 whether or not the time duration $\gamma$ is equal to or greater than a predetermined time $\tau$.

When the decision in the step S58 results in that the time duration $\gamma$ is equal to or greater than the predetermined time $\tau$ (i.e., "YES" in the decision step S58), this means that the state in which the integral correcting values $\Sigma Ki$ are fixed to the upper limit value $\alpha$ or the lower limit value $\beta$, respectively, has continued for a period longer than the predetermined time $\tau$ inclusive. Thus, it can be determined that abnormality is taking place. Accordingly, the abnormality occurrence flag FL is set to "1" in a step S59, whereon the processing routine illustrated in FIG. 7 comes to an end.

At the time point when the integral correcting value $\Sigma Ki$ starts to change or vary (i.e., when the fixed state is cleared), the processing returns to the step S52 from the step S56 described previously, whereon the initialization processing for the integral correcting value $\Sigma Ki$ is executed by the initializing means 208.

By contrast, when it is decided in the step S58 that the time duration $\gamma$ is shorter than the predetermined time $\tau$ (i.e., "NO" in the decision step S58), this means that the state in which the integral correcting value $\Sigma Ki$ is fixed has not continued longer than the predetermined time $\tau$ inclusive. Then, the processing routine illustrated in FIG. 7 is terminated as it is.

Figure 8:
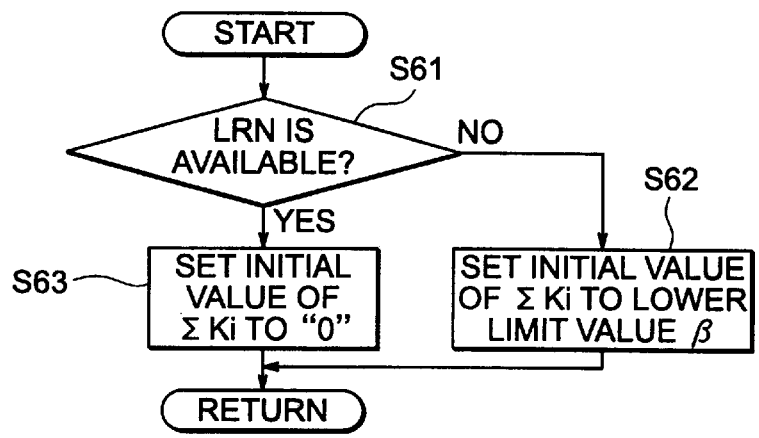
FIG. 8 is a flow chart for illustrating another initializing operation performed by the valve timing control system according to the first embodiment of the invention.

FIG. 8 is a flow chart for illustrating concretely the initialization processing step S52 in FIG. 7.

Referring to FIG. 8, the initializing means 208 references first a learned flag (not shown) set at the learning means 206 to thereby decide whether the learned value LRN is available or not (step S61).

When it is decided by the initializing means 208 in the step S61 that the learned value LRN is unavailable (i.e., when the decision step S61 results in "NO"), the lower limit value $\beta$ is set as the initial value of the integral correcting value $\Sigma Ki$ (step S62). By contrast, when decision is made in the step S61 that the learned value LRN is available (i.e., when the decision step S61 results in "YES"), the initial value of the integral correcting value $\Sigma Ki$ is set to "0" (zero)(step S63), whereon the processing routine illustrated in FIG. 8 comes to an end.

Figure 9:
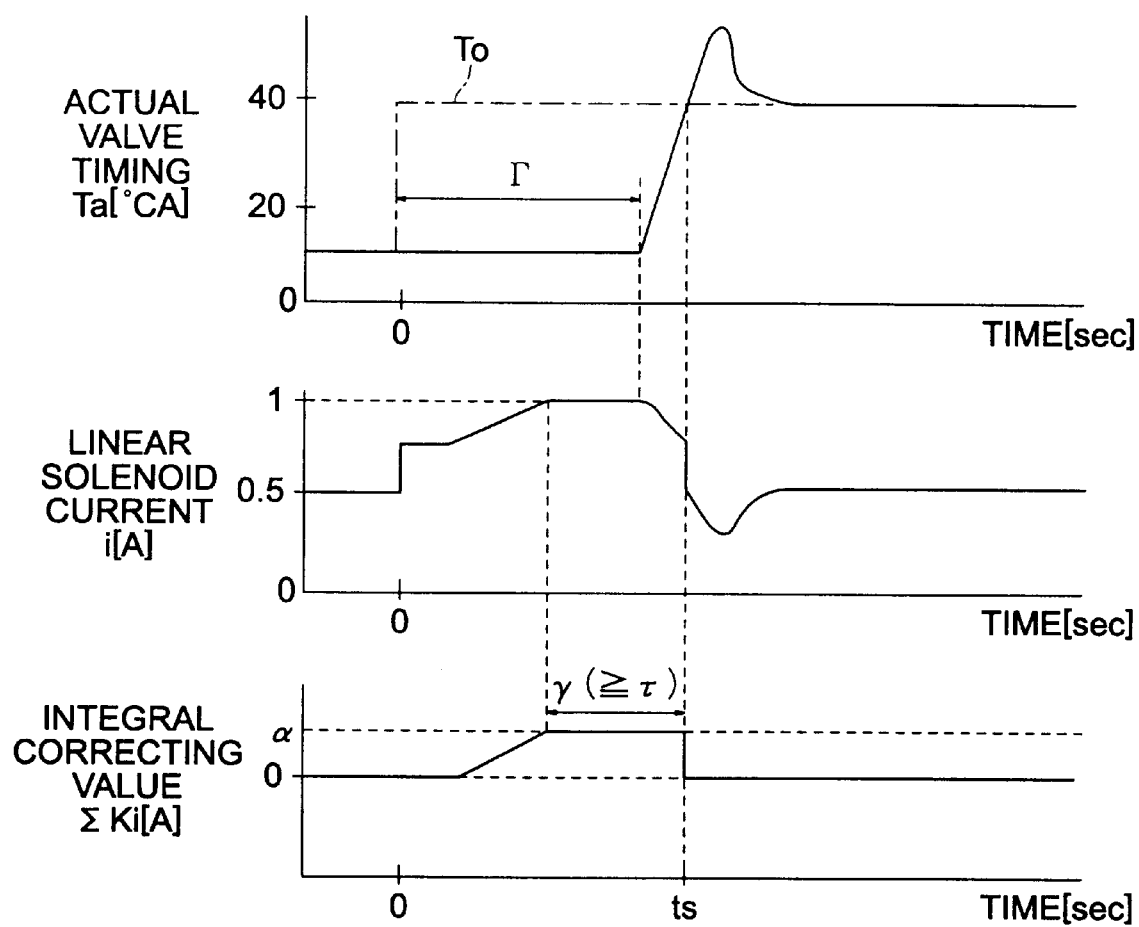
FIG. 9 is a flow chart for illustrating another initializing operation performed immediately after restoration from an abnormality occurrence state to a normal state by the valve timing control system according to the first embodiment of the present invention.

FIG. 9 is a timing chart for illustrating the initializing operation upon restoration to the normal operation state from the abnormality occurrence state on the presumption that the normal operation state is restored from the state where the integral correcting value ΣKi is fixed to the upper limit value α.

Referring to FIG. 9, in the case where the state in which the variable valve timing (VVT) mechanism 40 or the oil control valve (OCV) 80 does not work at all takes place over the fault occurrence period Γ, the integral correcting value ΣKi and the linear solenoid current i increase gradually.

The integral correcting value ΣKi will then be fixed at the upper limit value α over the time duration γ with the linear solenoid current i being fixed at a maximum value (=1.0 ampere).

When the actual valve timing Ta starts to change in response to the restoration of the variable valve timing mechanism 40 and the oil control valve 80 to the normal operation state, the integral correcting value ΣKi starts to decrease from the upper limit value α.

Consequently, in the step S54 and S55 illustrated in FIG. 7, decision is made that the integral correcting value ΣKi began to change. In that case, when it is decided in the step S58 and S59 that the time duration γ of the fixed state has extended to or beyond than the predetermined time τ, then the initialization processing of the integral correcting value ΣKi is started (step S52).

Actually, an initialization timing ts of the integral correcting value ΣKi is not determined at the time point at which the integral correcting value ΣKi starts to change from the upper limit value α but is determined at a time point at which the condition that ΣKi≠α is detected.

More specifically, the initialization processing of the integral correcting value ΣKi (step S52) is started at the time point at which the actual valve timing Ta has attained the desired valve timing To (i.e., the initialization timing ts).

In FIG. 9, it is presumed that the learned value LRN is available, by way of example, wherein the integral correcting value ΣKi is set forcibly to "0" (zero).

Thus, the overshoot state of the actual valve timing Ta ends in a short time and converges speedily to the desired valve timing To, whereby degradation of the operation performance (such as combustibility and exhaust gas quality) can be suppressed.

As will now be appreciated, the initializing means 208 is so arranged as to execute the initialization processing for the learned value LRN and the integral correcting value ΣKi in dependence on the state of the learned value LRN every time when the initializing condition is satisfied (i.e., every time when the initializing condition detecting signal is supplied from the initializing condition detecting means 207). Thus, the operation of the engine can always be optimized.

Embodiment 2

In the case of the valve timing control system according to the first embodiment of the invention, the initializing condition detection processing and the initialization processing are carried out by taking into account the upper limit value α and the lower limit value β of only the integral correcting value ΣKi. However, the processing mentioned just above may equally be executed by taking into account a sum value of the integral correcting value ΣKi and the learned value LRN which corresponds to the actual control quantity for the variable valve timing (VVT) mechanism 40.

In the following, description will be made of the valve timing control system according to a second embodiment of the present invention in which the initializing condition detection processing and the initialization processing are performed by employing the sum value of the integral correcting value ΣKi and the learned value LRN.

At first, it should be mentioned that the valve timing control system according to the instant embodiment of the invention can be realized by modifying partially the operation program or programs incorporated in the electronic control unit 100A described previously (refer to FIG. 1) and by replacing the integral correcting value ΣKi by "a sum value of the integral correcting value ΣKi and the learned value LRN".

The integral control means 205 incorporated in the electronic control unit 100A includes a limiting means for limiting the integral correcting value ΣKi so that the sum of the integral correcting value ΣKi and the learned value LRN can assume a value within a predetermined range.

Further, the initializing means 208 is so designed as to set an initial value of the sum of the integral correcting value ΣKi and the learned value LRN to a value within a range extending from the lower limit value of a predetermined range to "0" (zero). By way of example, the inial value of the sum may be set to the lower limit value mentioned above. In this way, optimization of the initial value of the sum can be effected.

Furthermore, the initializing condition detecting means 207 may be so designed or programmed as to detect as the initializing condition the timing or time point at which the sum value of the integral correcting value ΣKi and the learned value LRN changes for the first time after the sum value has remained coincident with the upper limit value or the lower limit value of the predetermined range continuously for a predetermined time (τ).

In this way, the actual control quantity for the variable valve timing (VVT) mechanism 40 and the oil control valve (OCV) 80 can be limited to the predetermined range by using the sum of the integral correcting value ΣKi and the learned value LRN and the variable valve timing mechanism 40, whereby operations of the variable valve timing mechanism 40 and the oil control valve 80 can be controlled within an actual range of tolerance. Thus, reliability of the valve timing control system can further be enhanced.

Embodiment 3

In conjunction with the valve timing control system according to the first embodiment of the invention, description has made on the presumption that the electronic control unit 100A includes the learning means 206. However, it goes without saying that even when the learning means 206 is spared, there can be obtained similar effects to those described previously by setting the initial value of the integral correcting value ΣKi to a negative value every time the initializing condition is satisfied.

Embodiment 4

In the case of the valve timing control system according to the first embodiment of the invention, it has been assumed that the invention is applied to the system in which the main body of the variable valve timing mechanism 40 is adapted to rotate in unison with the intake timing pulley 21 (see FIG. 10). However, the invention is never restricted to such arrangement but can equally find application to a system in which the main body of the variable valve timing mechanism 40 does not rotate.

Further, it goes without saying that the concept of the present invention can be equally applied to the system in which the actual valve timing Ta is detected by using a potentiometer.

Many features and advantages of the present invention are apparent from the detailed description and thus it is intended by the appended claims to cover all such features and advantages which fall within the true spirit and scope of the invention. Further, since numerous modifications and combinations will readily occur to those skilled in the art, it is not intended to limit the invention to the exact construction and operation illustrated and described.

By way of example, although the present invention has been described in conjunction with the system for controlling the valve timing, teachings of the invention can be implemented as the methods typified by the flow charts described hereinbefore in the form of program or programs which can be executed with the computer such as a microcomputer. Accordingly, it is intended that such methods, program(s) and a recording medium in which the program(s) is stored are to be covered by the present invention. Accordingly, all suitable modifications and equivalents may be restored to, falling within the spirit and scope of the invention.

What is claimed is:

1. A valve timing control system for an internal combustion engine, comprising:
    an intake valve and an exhaust valve driven in synchronism with rotation of said internal combustion engine for opening and closing an intake passage and an exhaust passage, respectively, which are communicated to a combustion chamber of said internal combustion engine;
    operation state detecting means for detecting operation state of said internal combustion engine;
    desired valve timing arithmetic means for arithmetically determining a desired valve timing for at least one of said intake valve and said exhaust valve in dependence on said engine operation state as detected;
    a variable valve timing mechanism for changing open/close timing for at least one of said intake valve and said exhaust valve;
    actual valve timing detecting means for detecting an actual valve timing of at least one of said intake valve and said exhaust valve;
    actual valve timing control means for generating a control quantity for said variable valve timing mechanism so that a timing deviation of said actual valve timing from said desired valve timing becomes zero;
    integral control means for arithmetically determining an integral correcting value by integrating said timing deviation for thereby correcting said control quantity;
    initializing condition detecting means for detecting as an initializing condition an engine operation state in which said integral correcting value is to be initialized; and
    initializing means for initializing said integral correcting value to an optimum value conforming with said engine operation state when said initializing condition is detected,
    wherein said initializing means is so designed as to set an initial value of said integral correcting value to a negative value.

2. A valve timing control system for an internal combustion engine according to claim 1,
    said integral control means including:
    limiting means for limiting said integral correcting value to a value within a predetermined range,
    wherein said initializing means is so designed as to set the initial value to a value within a range extending from a lower limit value of said predetermined range to "0" inclusive.

3. A valve timing control system for an internal combustion engine according to claim 2,
    wherein said initializing means is so designed as to set the initial value of said integral correcting value to said lower limit value of said predetermined range.

4. A valve timing control system for an internal combustion engine according to claim 2,
    wherein said initializing condition detecting means is so designed as to detect as said initializing condition a timing at which said integral correcting value changes for the first time after it has remained coincident with an upper limit value or said lower limit value of said predetermined range continuously for a predetermined time period.

5. A valve timing control system for an internal combustion engine according to claim 1,
    wherein said initializing condition detecting means is so designed as to detect as said initializing condition a timing which succeeds immediately to start of power supply to said valve timing control system.

6. A valve timing control system for an internal combustion engine according to claim 1,
    further comprising:
    learning means for learning as a learned value a control quantity required for holding said actual valve timing on the basis of said integral correcting value,
    wherein said initializing means is so designed as to set an initial value of said learned value to a median in design while setting an initial value of said integral correcting value to a negative value when said learned value has not been determined yet, whereas when said learned value is available, said initializing means sets the initial value of said integral correcting value to "0".

7. A valve timing control system for an internal combustion engine according to claim 6,
    said integral control means including:
    limiting means for limiting said integral correcting value to a value within a predetermined range,
    wherein said initializing means is so designed as to set the initial value to a value within a range extending from a lower limit value of said predetermined range to "0" inclusive.

8. A valve timing control system for an internal combustion engine according to claim 7,
    wherein said initializing means is so designed as to set the initial value of said integral correcting value to said lower limit value of said predetermined range.

9. A valve timing control system for an internal combustion engine according to claim 6,
    said integral control means including:
    limiting means for limiting said integral correcting value such that a sum of said integral correcting value and said learned value can assume a value within a predetermined range,
    wherein said initializing means is so designed as to set an initial value of said sum to a value within a range extending from said lower limit value of said predetermined range to "0" inclusive.

10. A valve timing control system for an internal combustion engine according to claim 9,
    wherein said initializing means is so designed as to set said initial value of said sum to said lower limit value of said predetermined range.

11. A valve timing control system for an internal combustion engine according to claim 7,
    wherein said initializing condition detecting means is so designed as to detect as said initializing condition a timing at which said integral correcting value changes for the first time after it has remained coincident with an upper limit value or said lower limit value of said predetermined range continuously for a predetermined time.

12. A valve timing control system for an internal combustion engine according to claim 9, wherein said initializing condition detecting means is so designed as to detect as said initializing condition a timing at which said sum value changes for the first time after it has remained coincident with an upper limit value or said lower limit value of said predetermined range continuously for a predetermined time.

13. A valve timing control system for an internal combustion engine according to claim 6, wherein said initializing condition detecting means is so designed as to detect as said initializing condition a timing which succeeds immediately to start of power supply to said valve timing control system.

* * * * *